(12) United States Patent
Germaine et al.

(10) Patent No.: US 11,451,716 B2
(45) Date of Patent: Sep. 20, 2022

(54) ILLUMINATION CONTROL FOR IMAGING SYSTEMS WITH MULTIPLE IMAGE SENSORS

(71) Applicant: Hand Held Products, Inc., Charlotte, NC (US)

(72) Inventors: Gennady Germaine, Mount Laurel, NJ (US); Paul Poloniewicz, Fort Mill, SC (US); Michael Miraglia, Mount Laurel, NJ (US); Benjamin Hejl, Mount Laurel, NJ (US); Gregory Rueblinger, Mount Laurel, NJ (US); Erik Van Horn, Mount Laurel, NJ (US); Tao Xian, Mount Laurel, NJ (US); David Wilz, Sr., Mount Laurel, NJ (US); Chen Feng, Mount Laurel, NJ (US); Shankar Ban, Fort Mill, SC (US)

(73) Assignee: Hand Held Products, Inc., Charlotte, NC (US)

( * ) Notice: Subject to any disclaimer, the term of this patent is extended or adjusted under 35 U.S.C. 154(b) by 0 days.

(21) Appl. No.: 17/157,979

(22) Filed: Jan. 25, 2021

(65) Prior Publication Data

US 2022/0239821 A1    Jul. 28, 2022

(51) Int. Cl.
*H04N 5/235* (2006.01)
*H04N 5/225* (2006.01)

(52) U.S. Cl.
CPC ......... *H04N 5/2354* (2013.01); *H04N 5/2256* (2013.01); *H04N 5/2258* (2013.01)

(58) Field of Classification Search
CPC .. H04N 5/2354; H04N 5/2258; H04N 5/2256; G06K 7/10732; G06K 7/10712; G06K 7/10722; G06K 7/10574
USPC ................................. 348/207.99; 235/462.42
See application file for complete search history.

(56) References Cited

U.S. PATENT DOCUMENTS

| 7,050,104 | B1 * | 5/2006 | Nakayama | G03B 15/05 |
| | | | | 348/E5.037 |
| 8,998,089 | B2 | 4/2015 | Chen et al. | |
| 9,185,306 | B1 | 11/2015 | Tan et al. | |
| 9,197,822 | B1 * | 11/2015 | Kobold | H04N 5/262 |
| 2003/0133018 | A1 * | 7/2003 | Ziemkowski | H04N 5/2256 |
| | | | | 348/211.2 |

(Continued)

FOREIGN PATENT DOCUMENTS

| EP | 3197145 A1 | 7/2017 |
| EP | 3343896 A1 | 7/2018 |

OTHER PUBLICATIONS

European search report dated Jul. 6, 2022 for EP Application No. 22151294.

*Primary Examiner* — Lin Ye
*Assistant Examiner* — Chan T Nguyen
(74) *Attorney, Agent, or Firm* — Alston & Bird LLP

(57) ABSTRACT

Embodiments of the disclosure relate generally to illumination synchronization in a multi-imager environment. Embodiments include systems, methods, computer program products, and apparatuses configured for operating a near-field illumination source associated with a near-field image sensor, based on a first illumination pulse train. An exposure period of a far-field image sensor is determined and one or more characteristics of the first illumination pulse train are modified to accommodate the exposure period of the far-field image sensor.

14 Claims, 12 Drawing Sheets

(56) References Cited

U.S. PATENT DOCUMENTS

| | | | |
|---|---|---|---|
| 2008/0277473 A1* | 11/2008 | Kotlarsky | G06K 7/10732 |
| | | | 235/462.07 |
| 2014/0183263 A1 | 7/2014 | Chen et al. | |
| 2015/0053767 A1 | 2/2015 | Sackett et al. | |
| 2017/0238420 A1* | 8/2017 | Mandelboum | H05K 1/0207 |
| | | | 362/3 |
| 2018/0106613 A1 | 4/2018 | Iwakura et al. | |
| 2019/0034683 A1 | 1/2019 | Giordano et al. | |
| 2019/0188513 A1* | 6/2019 | Beghtol | G06K 9/42 |

* cited by examiner

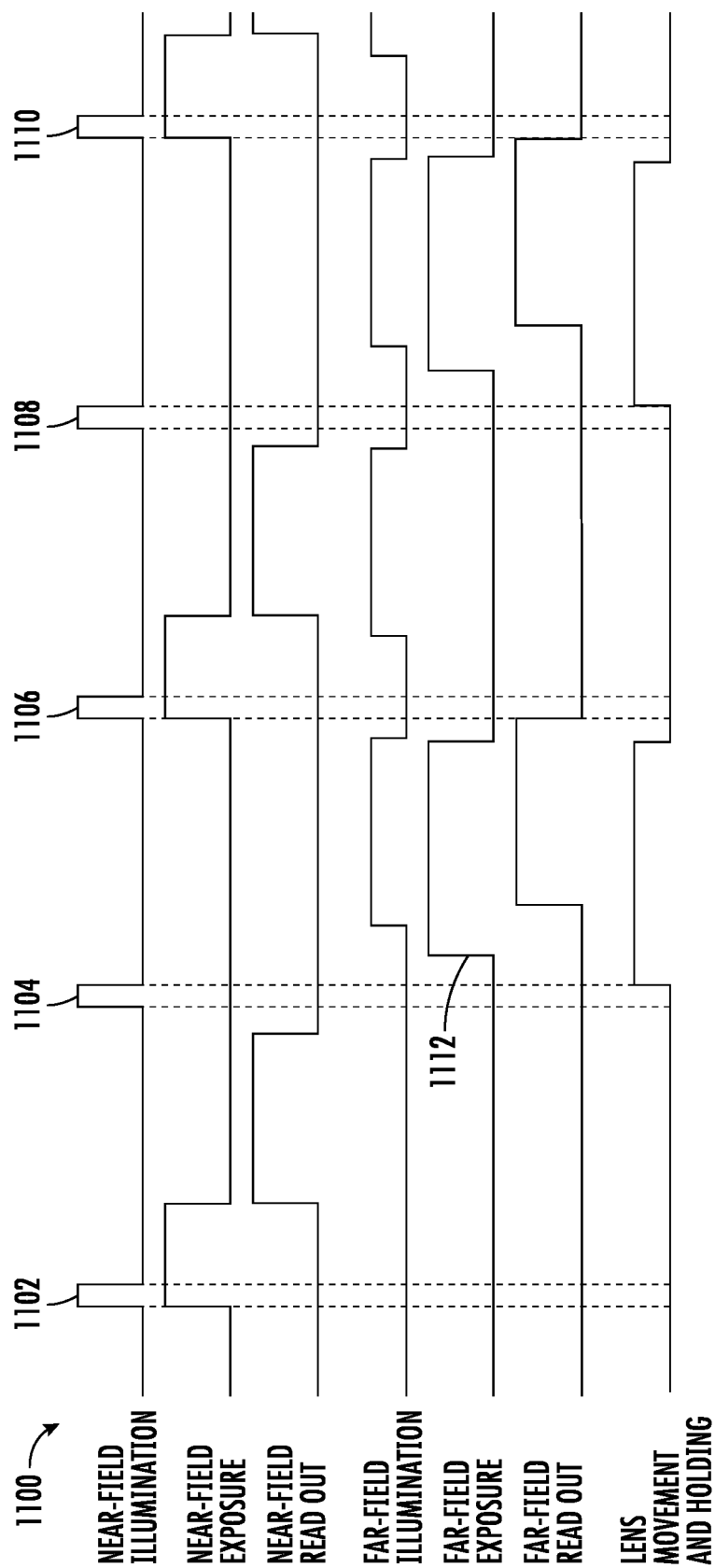

ILLUMINATION CONTROL FOR IMAGING SYSTEMS WITH MULTIPLE IMAGE SENSORS

TECHNOLOGICAL FIELD

Embodiments of the present disclosure generally relates to an imaging system with multiple image sensors, and more particularly to illumination control for image sensors of the imaging system.

BACKGROUND

Imaging devices and systems have found application in areas that are more sophisticated and advanced than mere photography. There has been a constant demand for improvement in the imaging capabilities of these devices and systems to fit support the new capabilities. With currently available imaging systems, factors such as miniaturized form factor have led to increase in interference between components of the imaging systems. In such systems, it remains a challenge to operate the components in a synchronized manner so as to prevent any adverse effect on each other's capabilities.

SUMMARY

In general, embodiments of the present disclosure provided herein are configured for illumination control and synchronization in a multi-imager environment. Other implementations for one or more of the alternative illuminator assemblies and/or alternative illumination imaging systems and apparatuses will be, or will become, apparent to one with skill in the art upon examination of the following figures and detailed description. It is intended that all such additional implementations be included within this description, be within the scope of the disclosure, and be protected by the following claims.

In accordance with some example embodiments, provided herein is an imaging system. In an example embodiment, the imaging system comprises a first illumination source associated with a first image sensor, the first illumination source being configured to operate based on a first illumination pulse train. The imaging system also comprises a second image sensor, and a controller communicatively coupled to each of the first illumination source, the first image sensor and the second image sensor. In some example embodiments, the controller is configured to determine a first exposure period of the second image sensor and modify one or more characteristics of the first illumination pulse train to accommodate the first exposure period of the second image sensor.

Additionally or alternatively, in some embodiments of the imaging system, to modify the one or more characteristics of the first illumination pulse train, the controller is further configured to insert at least one additional illumination pulse in the first illumination pulse train such that one of a start time period or an end time period of an illumination period of the at least one additional illumination pulse is aligned with a respective one of a start time period or an end time period of the first exposure period of the second image sensor.

Additionally or alternatively, in some embodiments of the imaging system, to modify the one or more characteristics of the first illumination pulse train, the controller is further configured to insert at least one additional illumination pulse in the first illumination pulse train such that illumination of the first image sensor corresponding to the at least one additional illumination pulse temporally overlaps an autofocus period of the second image sensor.

Additionally or alternatively, in some embodiments of the imaging system, to modify the one or more characteristics of the first illumination pulse train, the controller is further configured to increase a timing delay between a pair of temporally subsequent illumination pulses of the first illumination pulse train such that one of a start time period or an end time period of the first exposure period is aligned with a respective one of a start time period or an end time period of the increased timing delay.

Additionally or alternatively, in some embodiments of the imaging system, the first image sensor is exposed during at least a second exposure period. In some example embodiments, the exposure of the first image sensor during the second exposure period begins simultaneously with a start time period of a first illumination pulse of the first illumination pulse train, and an end time period of the second exposure period extends beyond an end time period of the first illumination pulse of the first illumination pulse train.

Additionally or alternatively, in some embodiments of the imaging system, the controller is further configured to obtain an image frame captured by exposure of the second image sensor during the first exposure period. In some example embodiments, the controller is further configured to determine a brightness of the image frame and activate a second illumination source associated with the second image sensor, based on the determined brightness of the image frame, wherein the second illumination source is configured to operate based on a second illumination pulse train.

Additionally or alternatively, in some embodiments of the imaging system, exposure of the first image sensor begins simultaneously with activation of the first illumination source.

Additionally or alternatively, in some embodiments of the imaging system, the second image sensor remains deactivated during a first illumination period of a first illumination pulse of the first illumination pulse train. Additionally or alternatively, in some embodiments, the second image sensor is exposed during a part of a second illumination period of a second illumination pulse of the first illumination pulse train.

In some example embodiments, an imaging method is provided. The method may be implemented using any one of a myriad of implementations, such as via hardware, software, and/or firmware of a multi-sensor imaging engine and/or multi-sensor imaging apparatus as described herein. In some example implementations of the method, the example method includes operating a first illumination source associated with a first image sensor, based on a first illumination pulse train. The example method further includes determining a first exposure period of a second image sensor and modifying one or more characteristics of the first illumination pulse train to accommodate the first exposure period of the second image sensor.

Additionally or alternatively, in some embodiments of the method, modifying the one or more characteristics of the first illumination pulse train comprises inserting at least one additional illumination pulse in the first illumination pulse train such that one of a start time period or an end time period of an illumination period of the at least one additional illumination pulse is aligned with a respective one of a start time period or an end time period of the first exposure period of the second image sensor.

Additionally or alternatively, in some embodiments of the method, modifying the one or more characteristics of the first illumination pulse train comprises inserting at least one additional illumination pulse in the first illumination pulse train such that illumination of the first image sensor corresponding to the at least one additional illumination pulse temporally overlaps an autofocus period of the second image sensor.

Additionally or alternatively, in some embodiments of the method, modifying the one or more characteristics of the first illumination pulse train comprises increase a timing delay between a pair of temporally subsequent illumination pulses of the first illumination pulse train such that one of a start time period or an end time period of the first exposure period is aligned with a respective one of a start time period or an end time period of the increased timing delay.

Additionally or alternatively, in some embodiments of the method, the method further comprises causing exposure of the first image sensor during at least a second exposure period. In some example embodiments, the exposure of the first image sensor during the second exposure period begins simultaneously with a start time period of a first illumination pulse of the first illumination pulse train. In some example embodiments, an end time period of the second exposure period extends beyond an end time period of the first illumination pulse of the first illumination pulse train.

Additionally or alternatively, in some embodiments of the method, the method further comprises obtaining an image frame captured by exposure of the second image sensor during the first exposure period. The example method further includes determining a brightness of the image frame and activating a second illumination source associated with the second image sensor, based on the determined brightness of the image frame, the second illumination source being configured to operate based on a second illumination pulse train.

In some example embodiments, an apparatus is provided. In an example embodiment, the apparatus comprises a memory configured to store executable instructions and one or more processors. In some example embodiments, the one or more processors are configured to execute the executable instructions to control operation of a first illumination source associated with a first image sensor, based on a first illumination pulse train. In some example embodiments, the one or more processors are further configured to determine a first exposure period of a second image sensor and modify one or more characteristics of the first illumination pulse train to accommodate the first exposure period of the second image sensor.

Additionally or alternatively, in some embodiments of the apparatus, to modify the one or more characteristics of the first illumination pulse train, the one or more processors are further configured to insert at least one additional illumination pulse in the first illumination pulse train such that one of a start time period or an end time period of an illumination period of the at least one additional illumination pulse is aligned with a respective one of a start time period or an end time period of the first exposure period of the second image sensor.

Additionally or alternatively, in some embodiments of the apparatus, to modify the one or more characteristics of the first illumination pulse train, the one or more processors are further configured to insert at least one additional illumination pulse in the first illumination pulse train such that illumination of the first image sensor corresponding to the at least one additional illumination pulse temporally overlaps an autofocus period of the second image sensor.

Additionally or alternatively, in some embodiments of the apparatus, to modify the one or more characteristics of the first illumination pulse train, the one or more processors are further configured to increase a timing delay between a pair of temporally subsequent illumination pulses of the first illumination pulse train such that one of a start time period or an end time period of the first exposure period is aligned with a respective one of a start time period or an end time period of the increased timing delay.

Additionally or alternatively, in some embodiments of the apparatus, the one or more processors are further configured to obtain an image frame captured by exposure of the second image sensor during the first exposure period. In some example embodiments of the apparatus, the one or more processors are further configured to determine a brightness of the image frame and activate a second illumination source associated with the second image sensor, based on the determined brightness of the image frame, wherein the second illumination source is configured to operate based on a second illumination pulse train.

BRIEF DESCRIPTION OF THE DRAWINGS

Figure 1A:
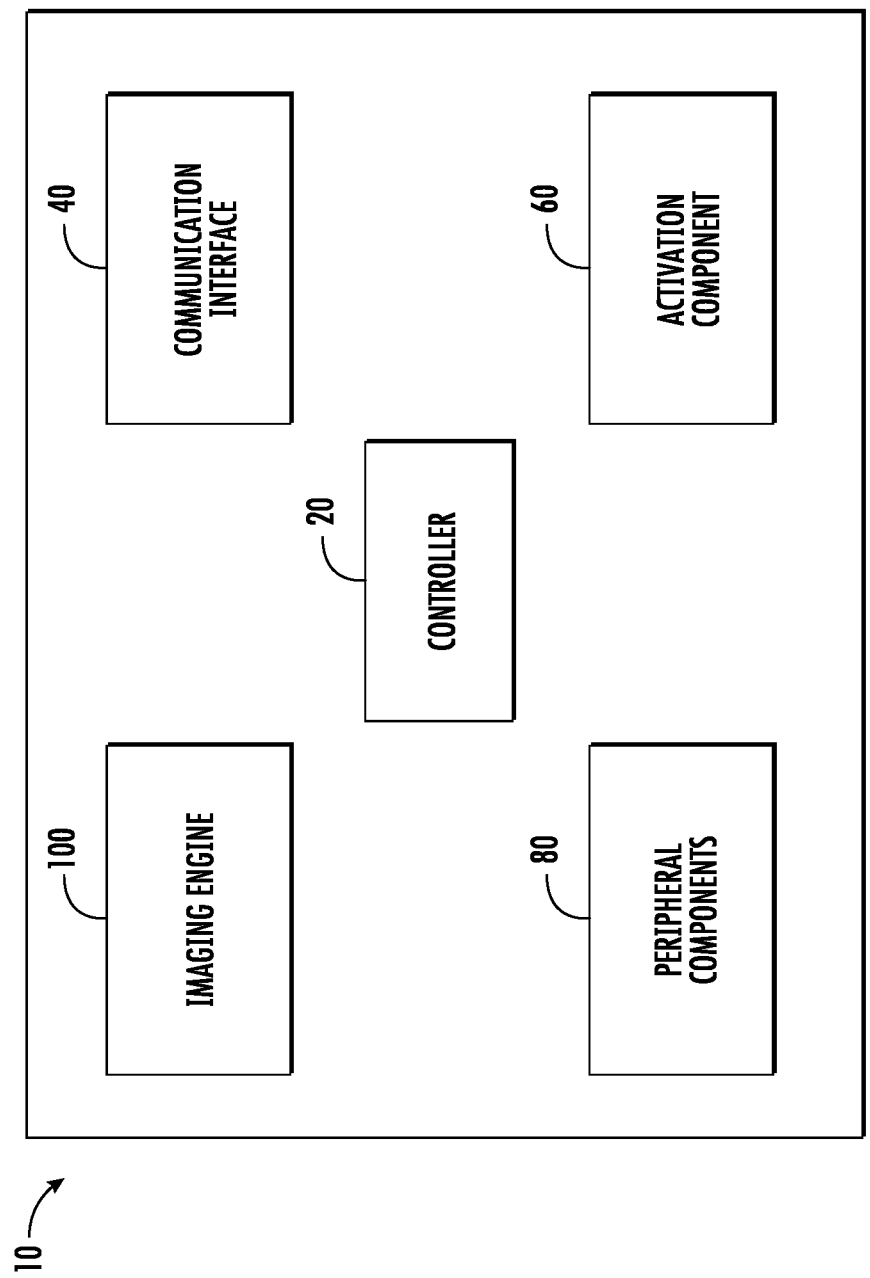
Figure 1B:
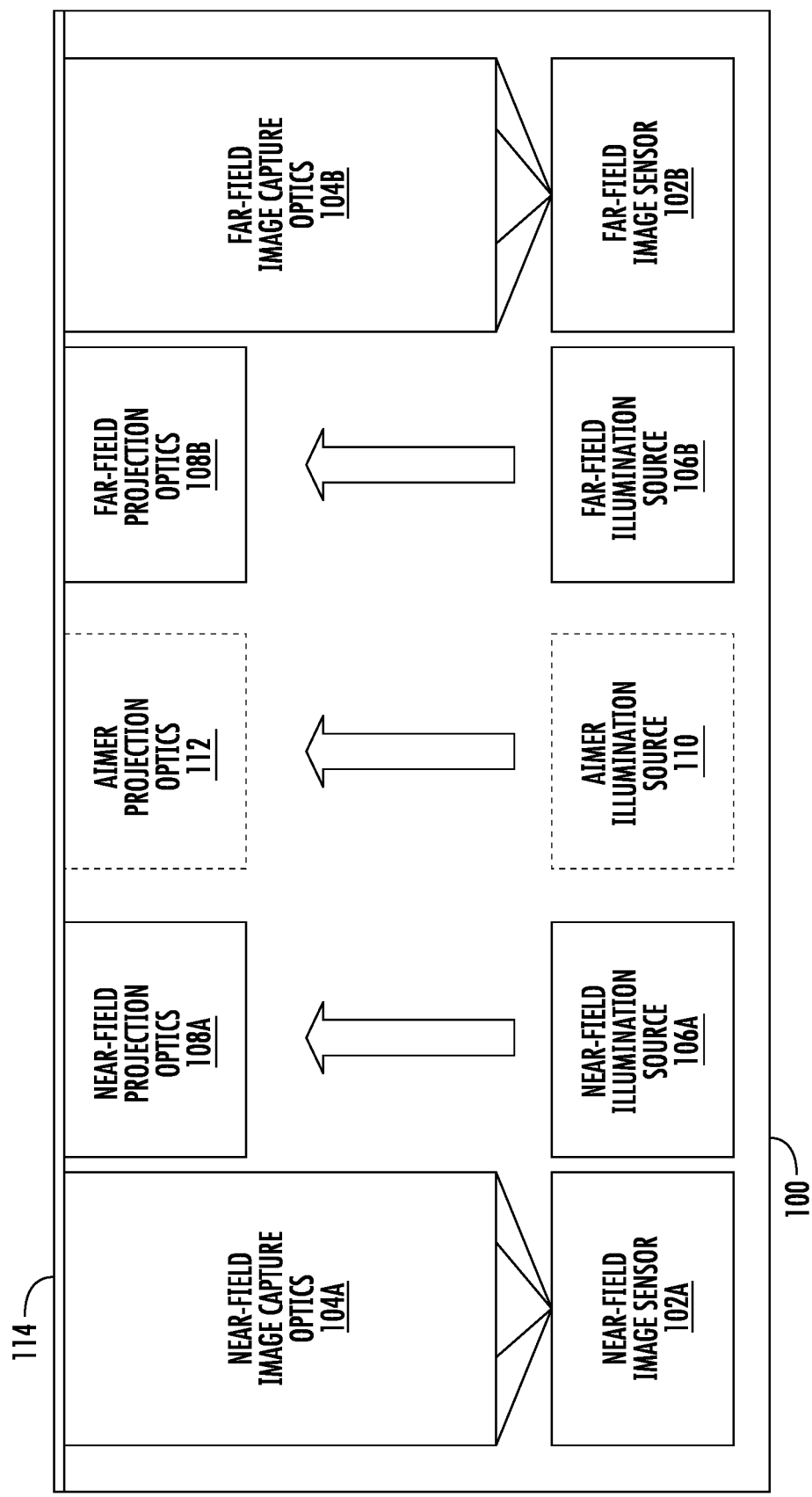
Figure 2:
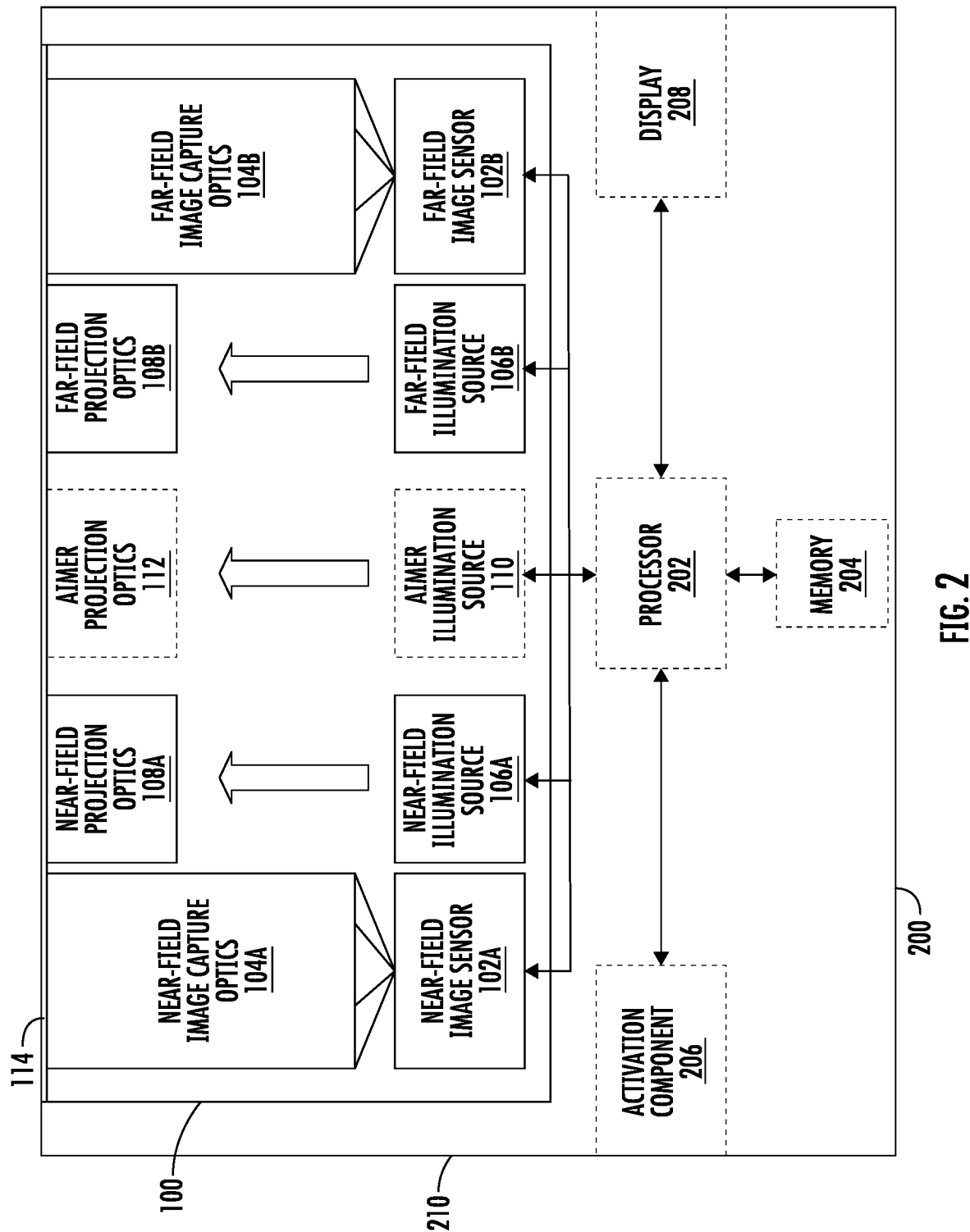
Figure 3:
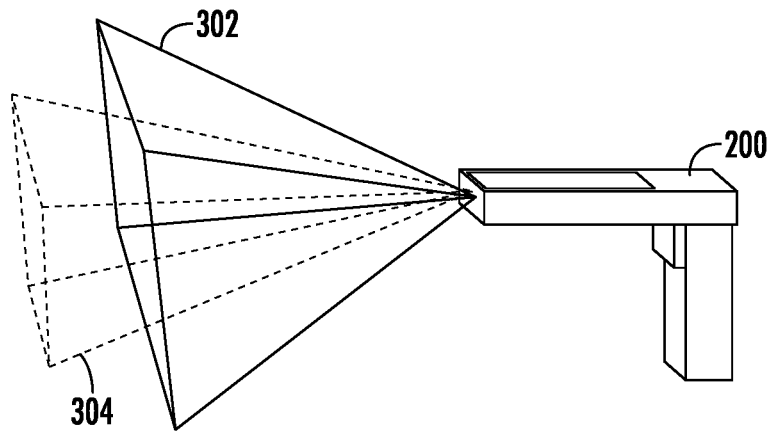
Figure 4:
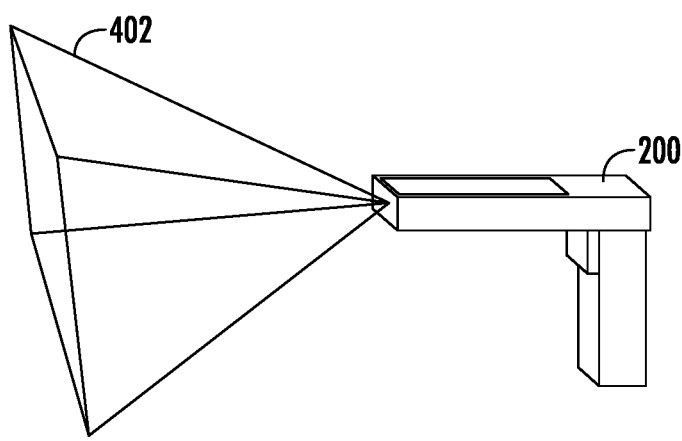
Figure 5:
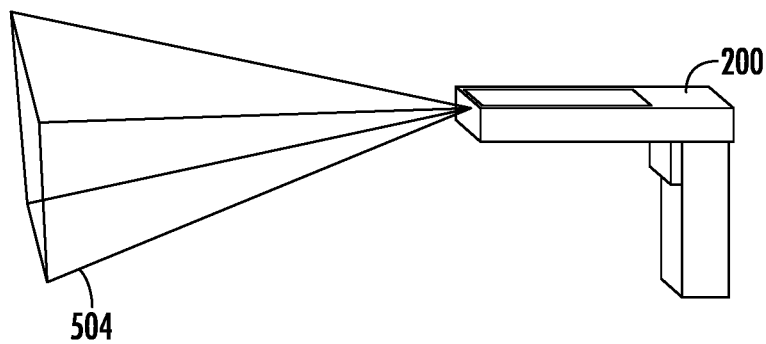
Figure 6:
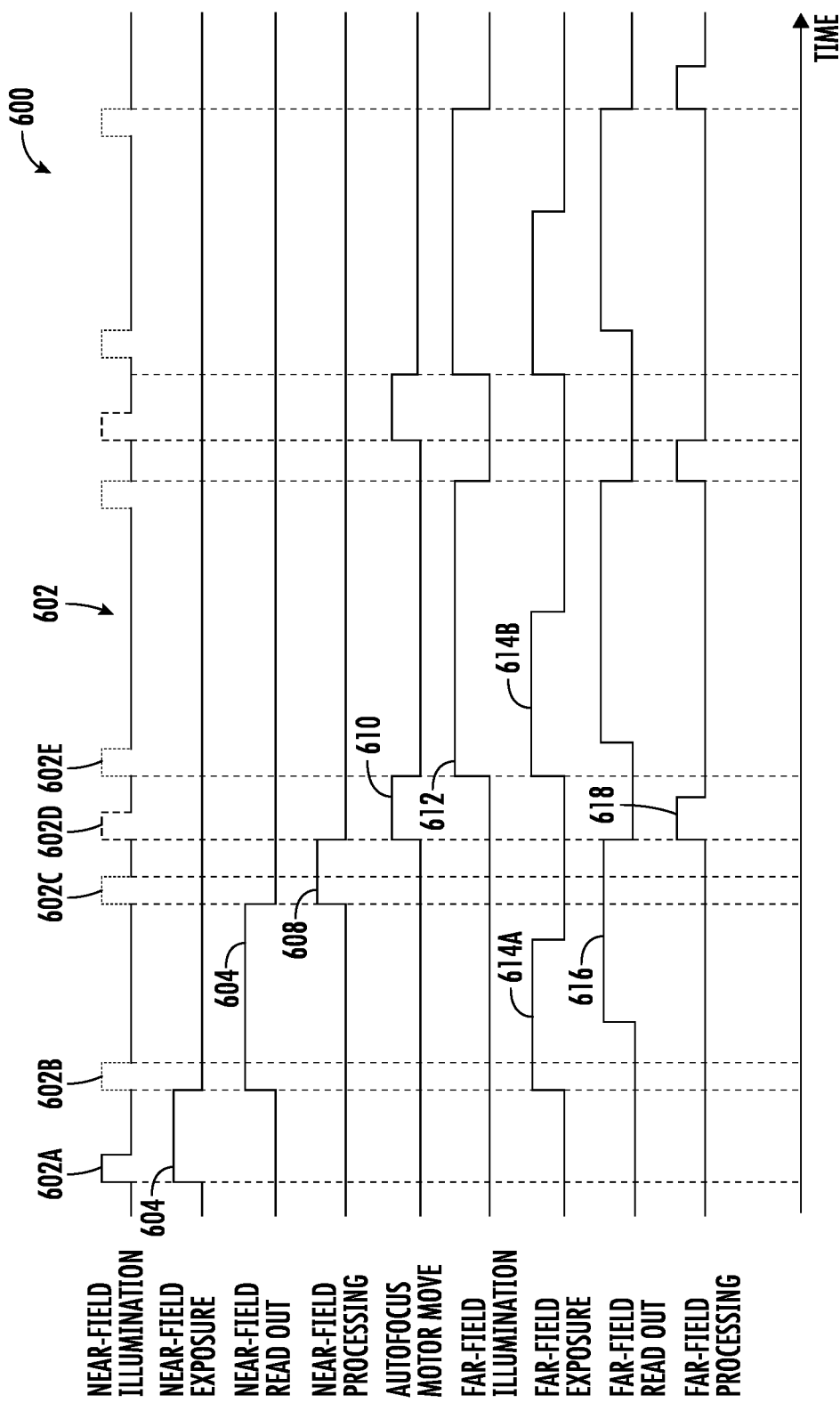
Figure 7:
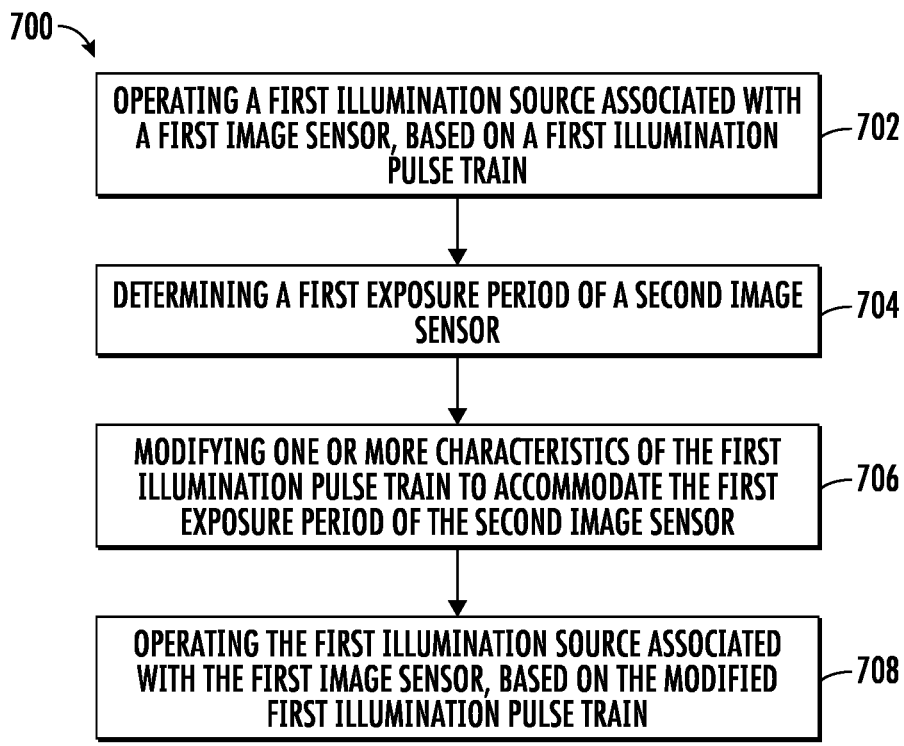
Figure 8:
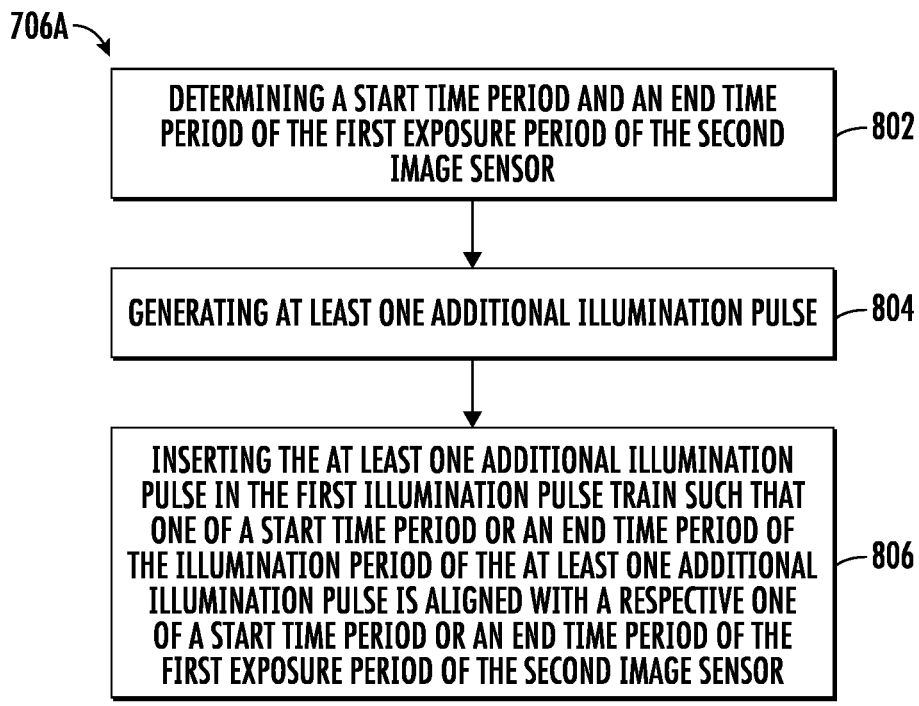
Figure 9:
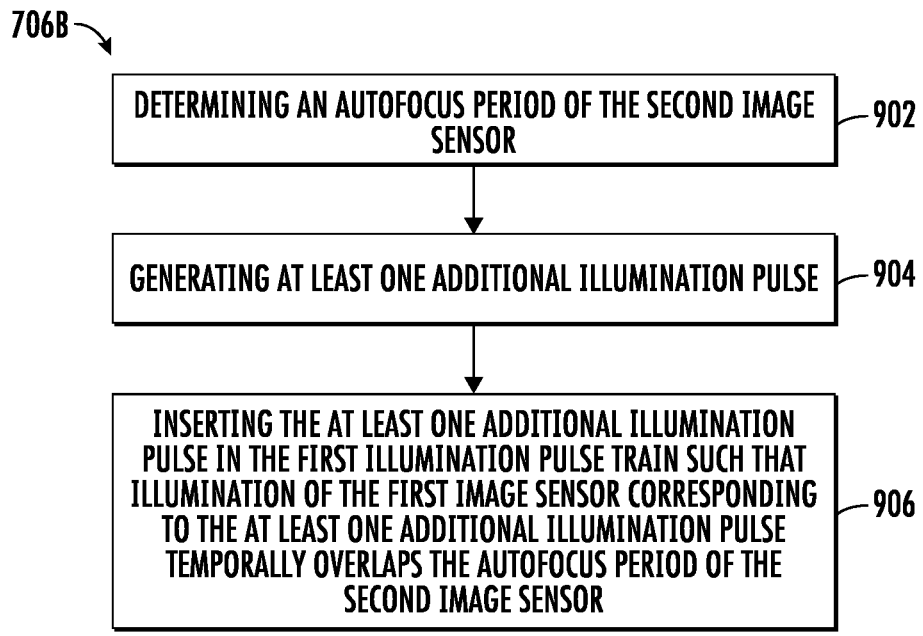
Figure 10:
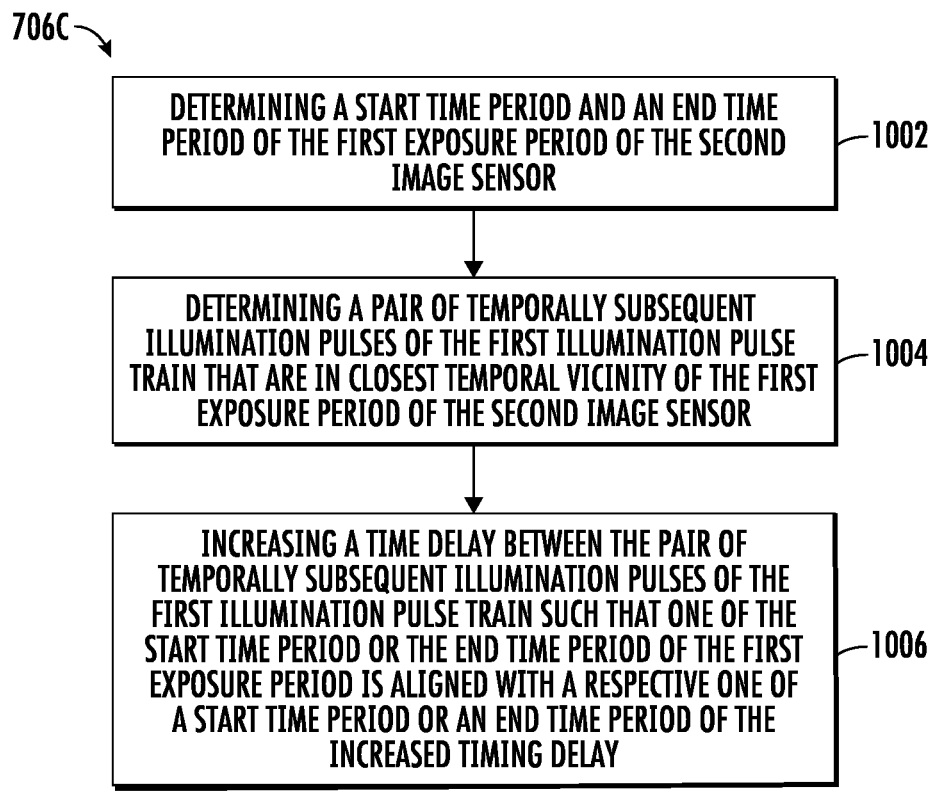
Figure 12A:
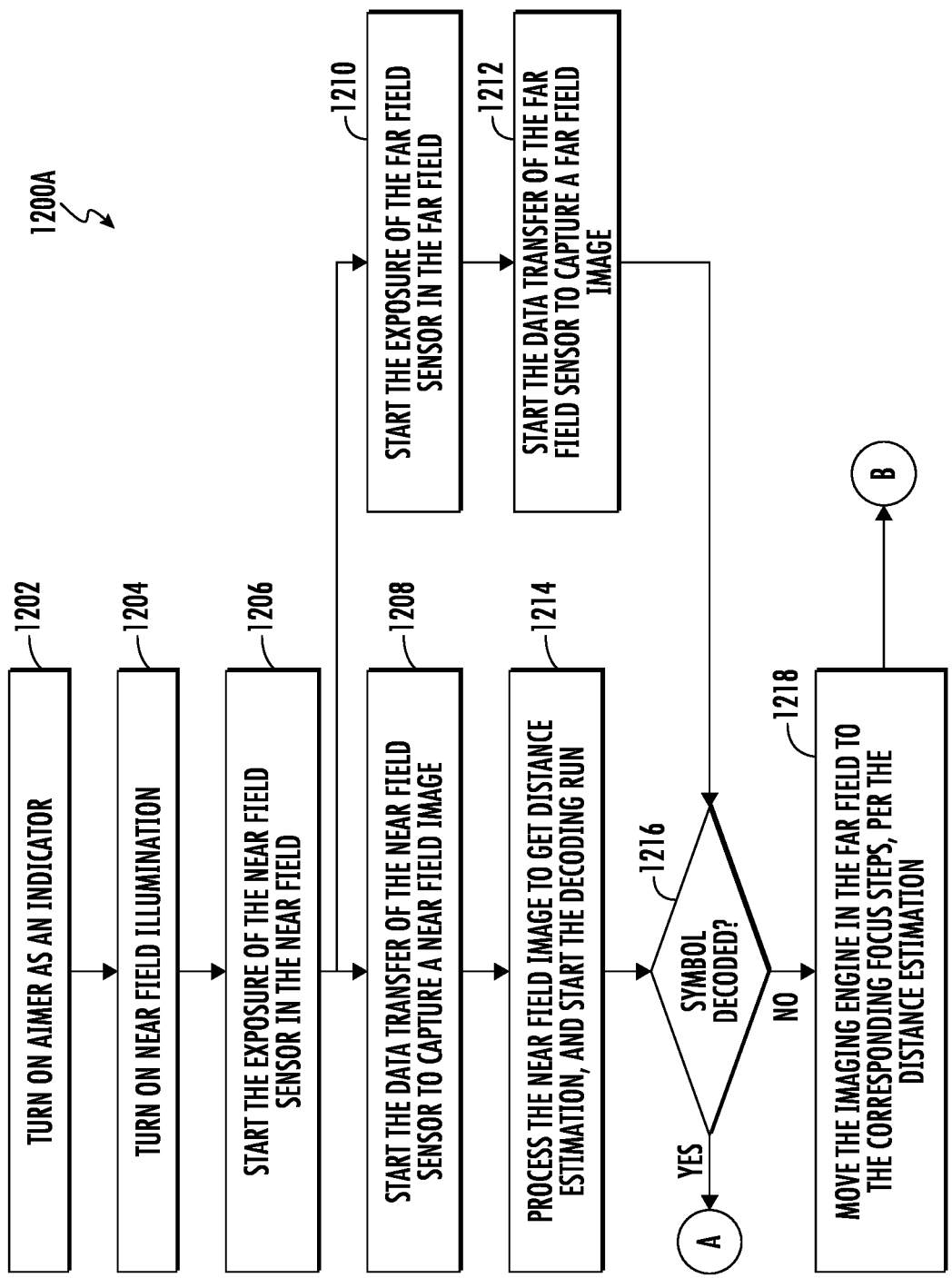
Figure 12B:
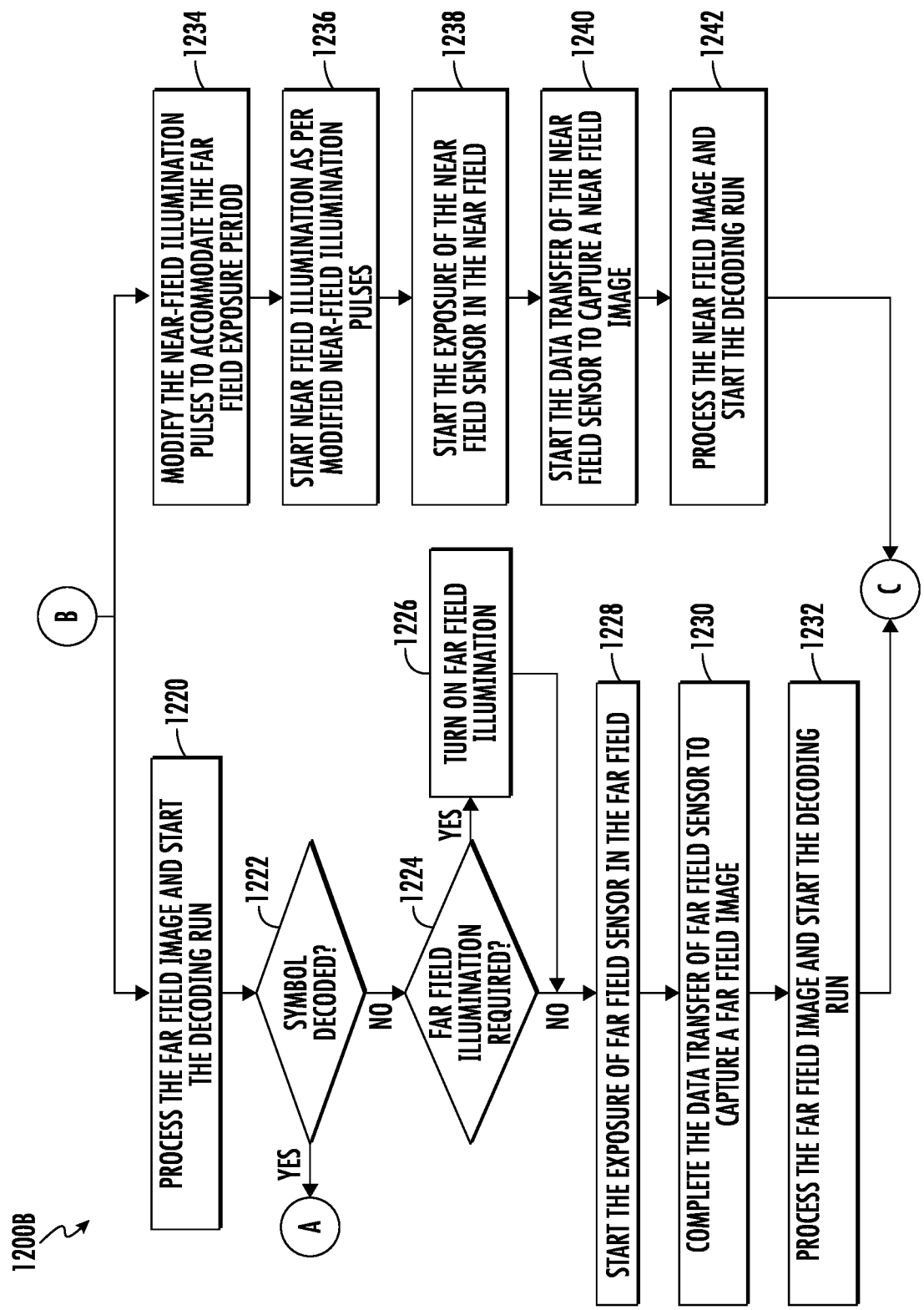
Figure 12C:
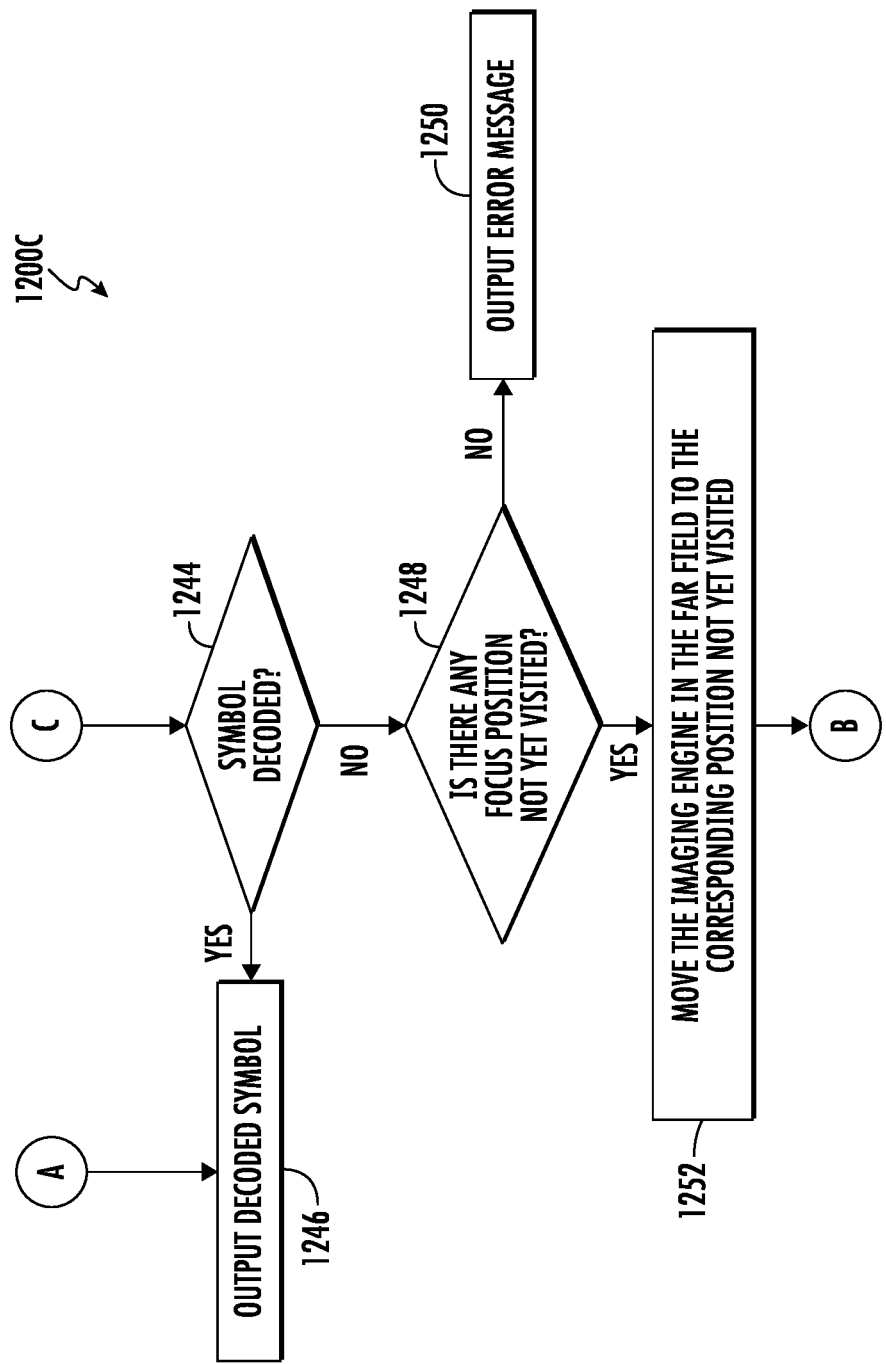
Figure 13:
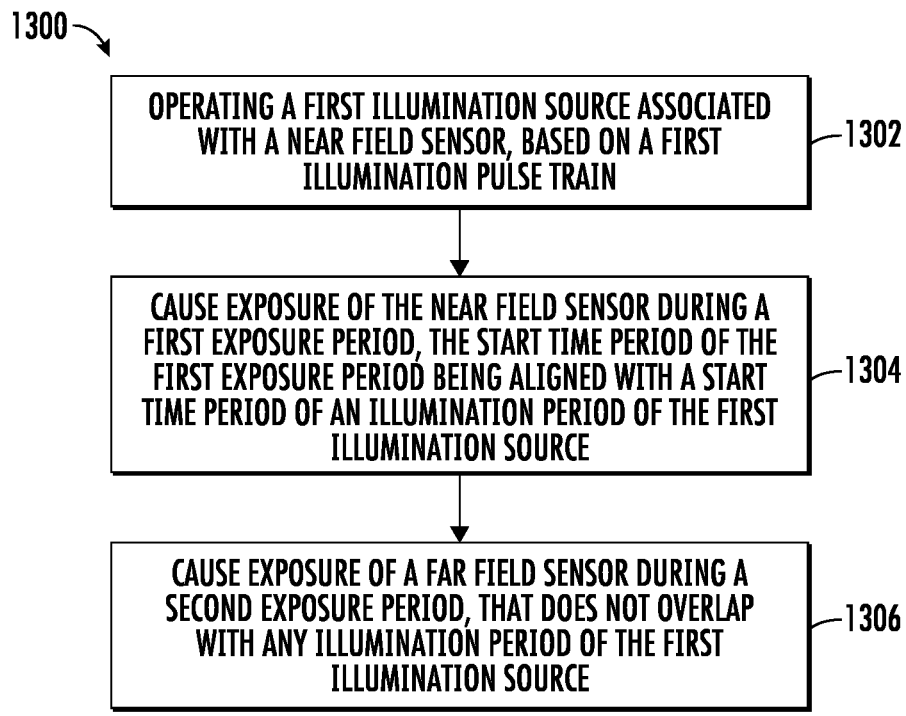
Figure 14:
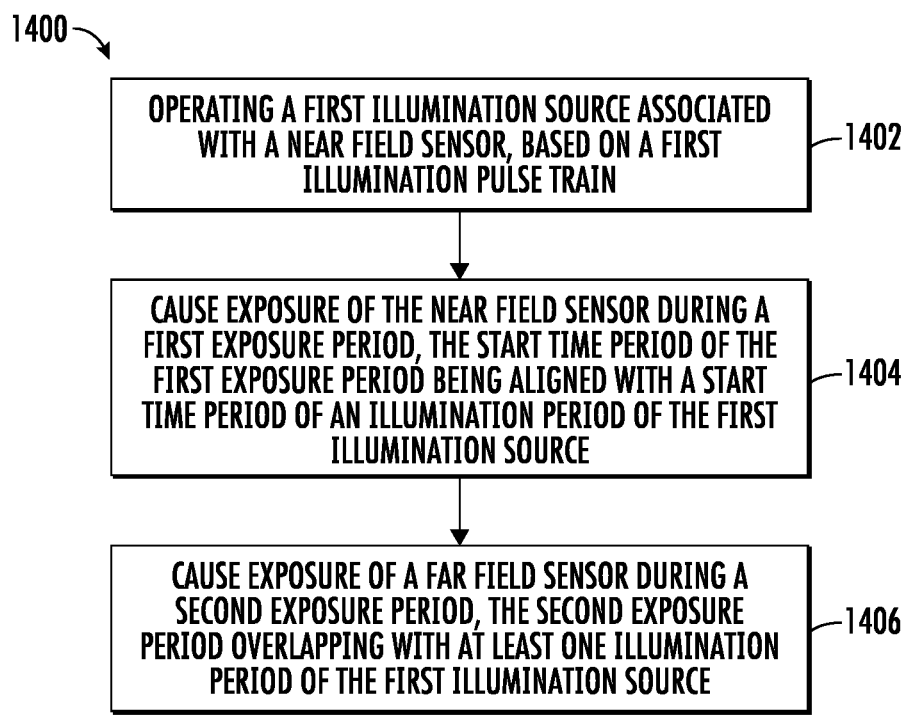

Having thus described the embodiments of the disclosure in general terms, reference now will be made to the accompanying drawings, which are not necessarily drawn to scale, and wherein:

FIG. 1A illustrates a block diagram of an example multi-sensor imaging system, in accordance with an example embodiment of the present disclosure;

FIG. 1B illustrates a block diagram of an example multi-sensor imaging engine, in accordance with an example embodiment of the present disclosure;

FIG. 2 illustrates a block diagram of an example multi-sensor imaging apparatus, in accordance with an example embodiment of the present disclosure;

FIG. 3 illustrates a visualization of field of views associated with an example multi-sensor imaging apparatus, in accordance with an example embodiment of the present disclosure;

FIG. 4 illustrates a visualization of a first illumination produced by an example multi-sensor imaging system, in accordance with an example embodiment of the present disclosure;

FIG. 5 illustrates a visualization of a second illumination produced by an example multi-sensor imaging system, in accordance with an example embodiment of the present disclosure;

FIG. 6 illustrates a timing diagram associated with operational functionality of an example multi-sensor imaging system, in accordance with an example embodiment of the present disclosure;

FIG. 7 illustrates a flowchart depicting example operations of a process for illumination control in a multi-imager environment, in accordance with an example embodiment of the present disclosure;

FIG. 8 illustrates a flowchart depicting example operations of a process for modifying one or more characteristics of a first illumination pulse train to accommodate a first exposure period of a second image sensor of an example multi-sensor imaging system, in accordance with an example embodiment of the present disclosure;

FIG. 9 illustrates a flowchart depicting example operations of another process for modifying one or more characteristics of a first illumination pulse train to accommodate a first exposure period of a second image sensor of an example multi-sensor imaging system, in accordance with an example embodiment of the present disclosure;

FIG. 10 illustrates a flowchart depicting example operations of another process for modifying one or more characteristics of a first illumination pulse train to accommodate a first exposure period of a second image sensor of an example multi-sensor imaging system, in accordance with an example embodiment of the present disclosure;

FIG. 11 illustrates a timing diagram associated with operational functionality of an example multi-sensor imaging system for flicker reduction, in accordance with an example embodiment of the present disclosure;

FIGS. 12A, 12B, and 12C illustrate an example workflow of a symbol decoding process, in accordance with an example embodiment of the present disclosure;

FIG. 13 illustrates an example workflow of a flicker reduction process, in accordance with an example embodiment of the present disclosure; and FIG. 14 illustrates an example workflow of a flicker reduction process for extended far field exposures of an imaging apparatus in accordance with an example embodiment of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the disclosure may be embodied in many different forms and should not be construed as limited to the embodiments set forth herein, rather, these embodiments are provided so that this disclosure will satisfy applicable legal requirements. Like numbers refer to like elements throughout.

Imaging apparatuses, such as indicia readers, are used in a variety of scenarios, each requiring a specific set of imaging requirements to be met so that an operation associated with the indicia reader such as symbol decoding may be successively carried out. Additionally, certain safety requirements, for example pertaining to the operator of the indicia reader, have to be satisfied to ensure compliance with statutory rules. Indicia readers usually require a symbol affixed on a surface to be scanned from a close range to successfully decode them. However, in some environments such as warehouses, it is not possible to scan and successively decode symbols affixed on parcels and consignments by reaching out to each consignment from a close range. As such, an extended range indicia reader is provided which does not require an operator to individually reach out to each consignment from a close range. Such an extended range indicia reader is able to scan multiple symbols from a single operator position owing to the far field scanning capability of the extended range reader. Such indicia readers include multiple image sensors and associated optics to provide these capabilities.

The illumination requirements of the sensors may vary greatly. For example, while one or more image sensors of the indicia reader may require illumination even during data read-out, other sensors may not. As such, keeping the light source of one image sensor activated for a longer period may result in interference with the exposure period of another sensor for which illumination is not desired. Such interference may result in images that are flawed in terms of one or more imaging characteristics, thereby negatively impacting the resultant image processing task. The problem is especially prevalent in miniaturized imaging devices in which the sensors, illumination sources, and other optics and components are placed closely. Further, in the context of multi-imager environments (e.g., including multiple imagers and/or multiple light sources), naïve implementations for capturing images, such as by alternating between imagers and/or light sources, exacerbate flickering effects, and therefore exacerbate the negative effects associated therewith.

Often in scenarios where the image sensors are of different types, it is difficult to synchronize the illuminations of the sensors for successful operation. For example, when the indicia reader includes a rolling shutter sensor for imaging in the far field and a global shutter sensor for imaging in the near field, it becomes difficult to ensure optimum illumination conditions for the global shutter sensor due to extended illumination time of the rolling shutter during data readout. This results in producing undesired effects such as snappiness in the image captured by the global shutter sensor. Further, the extended illumination time may also result in heat generation that impacts the heat management system in the barcode scanner. Furthermore, in outdoor environments illumination may not always be required for far field imaging due to sufficient ambient light being available. As such, the aimer of the imaging system may not be distinguishable from the background, thereby requiring quick focus to adjust the focus position of the image sensor.

Additionally, controlling the illumination of such apparatuses is useful for providing a visual appearance that is preferable to operators. For example, if an illumination pulse is within a certain frequency range (e.g., below a certain threshold frequency), the operator could experience headaches and/or seizures from viewing exposure to the illumination. In multi-imager contexts having a plurality of illumination sources, each illumination source should be configured accordingly to prevent such negative health effects and undesired visual appearance. Regardless, if illumination sources are cycled through and/or otherwise often switched between, the operator may experience a "flickering" effect that may be undesirable or harmful as well.

Some embodiments described herein relate to a dual illumination framework for multi-sensor imaging systems that include multiple illumination sources and multiple image sensors. Some embodiments described herein utilize a first illumination source and a first image sensor for capturing image(s) during one or more illumination pulses of an illumination pulse train associated with the first illumination source. Embodiments further capture images utilizing a second image sensor, where the exposure period of the second image sensor is considered to modify the first illumination pulse train such that the illumination of the first illumination source does not introduce any undesired effect in the image captured by the second image sensor. Further, the illumination of the second image sensor is timed in a manner that does not affect the image captured by the first image sensor.

In some embodiments, one or more events may be triggered indicating circumstances where activation of a second illumination source is required. In this regard, the second illumination source may produce a second illumination for illuminating a second field of view associated with the second image sensor. In one such example context, the activation of the second illumination source is triggered after determining that an object is not detectable within the captured images in a first field of view using the first illumination source and/or in the second field of view using ambient light illumination, and thus is likely at a further distance from the imaging apparatus. The activation of the second illumination source may be triggered in response to detecting one or more events and/or circumstances, for example in response to processing one or more previously captured images to determine a threshold number of images have been captured, and that no object is detectable within the captured images in very low lighting conditions (e.g., below a certain white value threshold).

In such circumstances, the change to another illumination source enables the second image sensor to be triggered during the illumination pulses of the newly activated second illumination source to improve the effective reading range of the apparatus. In embodiments having more than two illumination sources, the same considerations may continue for cycling through more than two illumination sources, for example narrowing the field of view illuminated by each illumination source and extending the effective range with each cycle. Alternatively, one or more illumination sources may be skipped, for example where the cycle immediately proceeds from a broadest illumination source to a narrowest illumination source without utilizing one or more intermediate illumination source(s).

Such embodiments provide effective synchronization of the illumination sources with flicker reduction and/or flicker elimination while enabling effective and efficient capturing of images for processing. The operation of such embodiments captures images in a manner likely to result in successfully completing an image processing task, such as indicia or symbol scanning, while increasing the likelihood an image is captured within a desired operational time frame that includes data sufficient for successful processing. By way of implementation of various example embodiments described herein, an operational efficiency of the imaging apparatus is maintained or improved while addressing the challenges arising out of usage of multiple sensors and illumination sources.

In some embodiments, some of the operations above may be modified or further amplified. Furthermore, in some embodiments, additional optional operations may be included. Modifications, amplifications, or additions to the operations above may be performed in any order and in any combination.

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Definitions

The term "illumination" refers to one or more light rays produced by an illumination source within a defined field of view. In at least one example context, the illumination includes one or more illumination pulses produced by a corresponding illumination source. In some embodiments, an illumination is produced based on a "defined pulse frequency," which refers to a rate at which illumination pulses are produced by an illumination source. Additionally or alternatively, in some embodiments, an illumination is produced based on a "defined pulse phase," which refers to a period of activation for which an illumination source is producing a corresponding illumination.

Thus, multiple illumination pulses with a defined pulse frequency together may constitute an "illumination pulse train". Each illumination pulse may extend in time domain for a duration referred to as "illumination period". Thus, the illumination period may refer to the time duration for which an amplitude of the illumination pulse remains non-zero. That is, illumination period of an illumination pulse refers to the period for which the illumination source remains activated corresponding to the illumination pulse.

In at least one example context, an illumination pulse is associated with an "illumination pulse start time," which refers to electronically managed data representing a time at which a corresponding illumination source will begin producing the illumination pulse. Additionally or alternatively, in at least one such context, an illumination pulse is associated with an "illumination pulse end time," which refers to electronically managed data representing a time at which a corresponding illumination source will cease producing the illumination pulse.

The term "start time period of an illumination period" refers to a time period of a threshold duration starting from an illumination pulse start time, where the threshold duration may have a configurable value. In at least one example context, the threshold duration may be zero and as such, the term start time period of an illumination period and the illumination pulse start time may refer to the same instance in time. Each illumination pulse may have an individual start time period.

The term "end time period of an illumination period" refers to a time period of a threshold duration ending at an illumination pulse end time, where the threshold duration may have a configurable value. In at least one example context, the threshold duration may be zero and as such, the term end time period of an illumination period and the illumination pulse end time may refer to the same instance in time. Each illumination pulse may have an individual end time period.

The term "illumination source" (also referred to as "illuminator source" or "illuminator") refers to one or more light generating hardware, devices, and/or components configured to produce an illumination within a desired field of view. Non-limiting examples of an illumination source includes one or more light emitting diode(s) (LEDs), laser(s), and/or the like.

The term "near-field illumination source" refers to an illumination source configured to produce an illumination for illuminating a near-field of view associated with a near-field image sensor. In at least one example context, the near-field illumination source is configured to produce an illumination in a wider field of view as compared to that of a far-field illumination source.

The term "far-field illumination source" refers to an illumination source configured to produce an illumination for illuminating a far-field of view associated with a far-field imager. In at least one example context, the far-field illumination source is configured to produce an illumination in a narrower field of view as compared to that of a near-field illumination source.

The term "near-field illumination" refers to a particular illumination produced by a near-field illumination source. In some embodiments, the near-field illumination is associated with illumination of a near field of view captured by a near-field image sensor. The term "near-field illumination pulse" refers to an illumination pulse of a near-field illumination associated with a near-field sensor.

The term "far-field illumination" refers to a particular illumination produced by a far-field illumination source. In some embodiments, the far-field illumination is associated with illumination of a far field of view captured by a far-field image sensor. The term "far-field illumination pulse" refers to an illumination pulse of a far-field illumination.

The term "imager" refers to one or more components configured for capturing an image representing a particular field of view. In at least one example context, an imager includes at least one optical component (e.g., lens(es) and/or associated housing(s)) defining a particular field of view. Additionally or alternatively, in at least one example context, an imager includes an image sensor configured to output an image based on light that engages with the image sensor, such as via the optical components.

The term "image sensor" refers to one or more components configured to generate an image represented by a data object based on light incident on the image sensor. In some such example contexts, an image sensor converts light waves that interact with the image sensor into signals representing an image output by the sensor.

The term "near-field image sensor" refers to an image sensor configured for capturing an image of a near field of view. In at least one context, the near-field image sensor comprises at least one near-field optical component(s) defining the near field of view, and an electronic sensor. In at least one example context, the near-field image sensor may include a global shutter. In some example contexts, the near-field image sensor may include a rolling shutter. The term "near-field image" refers to electronic data generated by the near-field image sensor that embodies a captured representation of the near field of view.

The term "far-field image sensor" refers to an image sensor configured for capturing an image of a far-field of view. In at least one context, the far-field image sensor comprises at least one far-field optical component(s) defining the far field of view, and an electronic sensor. In at least one example context, the far-field image sensor may include a rolling shutter. In some example contexts, the far-field image sensor may include a global shutter. The term "far-field image" refers to electronic data generated by the far-field image sensor that embodies a captured representation of the far field of view.

The term "exposure period" refers to electronic data representing a length of time that an image sensor is configured for exposure to oncoming light. In at least one example embodiment, an image sensor of an imager is configured to utilize a variable exposure time that may be set to a particular exposure time value.

The term "start time period of an exposure period" refers to a time period of a threshold duration starting from a start of the exposure period. The threshold duration may have a configurable value. In one example, the threshold duration may be zero and as such, the term start time period of an exposure period and the start of the exposure period may refer to the same instance in time.

The term "end time period of an exposure period" refers to a time period of a threshold duration ending at an end of the exposure period where the threshold duration may have a configurable value. In one example, the threshold duration may be zero and as such, the term end time period of an exposure period and the end of the exposure period may refer to the same instance in time.

FIG. 1A illustrates a block diagram of an example multi-sensor imaging system 10 (hereinafter, also referred to as imaging system 10), in accordance with an example embodiment of the present disclosure. The multi-sensor imaging system 10 includes an imaging engine 100 communicatively coupled with a controller 20, a communication interface 40, an activation component 60, and one or more peripheral components 80. In some example embodiments, the imaging system 10 may include fewer or more components than shown in FIG. 1A. The imaging system 10 is configured for capturing one or more images of a target in one or more fields of views using one or more illumination sources. The imaging system 10 processes the one or more images to execute one or more image processing tasks such as indicia reading. Accordingly, in some example embodiments of the disclosure, the imaging system 10 may be embodied in part or full as an indicia or symbol reader or a handheld device capable of reading indicia and similar symbols. One example embodiment of the imaging system 10 is illustrated in FIG. 2, details of which will be described in the subsequent portions of the disclosure.

Controller 20 may be configured to carry out one or more control operations associated with the imaging system 10. For example, controller 20 may control the imaging engine 100 to cause image capture of a target in a field of view of the imaging engine 100. Additionally, the controller 20 may process the captured images to carry out one or more image processing tasks. The controller 20 may be embodied as a central processing unit (CPU) comprising one or more processors and a memory. In some example embodiments, the controller 20 may be realized using one or more microcontroller units (MCU), as one or more of various hardware processing means such as a coprocessor, a microprocessor, a digital signal processor (DSP), a processing element with or without an accompanying DSP, or various other processing circuitry including integrated circuits such as, for example, an ASIC (application specific integrated circuit), an FPGA (field programmable gate array), a hardware accelerator, a special-purpose computer chip, or the like. In some embodiments, the processor of the controller 20 may include one or more processing cores configured to operate independently. A multi-core processor may enable multiprocessing within a single physical package. Additionally, or alternatively, the processor may include one or more processors configured in tandem via the bus to enable independent execution of instructions, pipelining and/or multithreading.

The memory may be non-transitory and may include, for example, one or more volatile and/or non-volatile memories. For example, the memory may be an electronic storage device (for example, a computer readable storage medium) comprising gates configured to store data (for example, bits) that may be retrievable by a machine (for example, a computing device like the processor). The memory may be configured to store information, data, content, applications, instructions, or the like, for enabling the apparatus to carry out various functions in accordance with an example embodiment of the present invention. For example, the memory could be configured to buffer data for processing by the processor. Additionally, or alternatively, the memory could be configured to store instructions for execution by the processor.

The processor (and/or co-processors or any other processing circuitry assisting or otherwise associated with the processor) may be in communication with the memory via a bus for passing information among components of the imaging system 10. The processor may be configured to execute instructions stored in the memory or otherwise accessible to the processor. Additionally, or alternatively, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. The processor may include, among other things, a clock, an arithmetic logic unit (ALU) and logic gates configured to support operation of the controller 20.

The communication interface 40 may comprise input interface and output interface for supporting communications to and from the imaging system 10. The communication interface 40 may be any means such as a device or circuitry embodied in either hardware or a combination of hardware and software that is configured to receive and/or transmit data to/from a communications device in communication with the imaging system 10. In this regard, the communication interface 40 may include, for example, an antenna (or multiple antennae) and supporting hardware and/or software for enabling communications with a wireless communication network. Additionally or alternatively, the communication interface 40 may include the circuitry for interacting with the antenna(s) to cause transmission of signals via the antenna(s) or to handle receipt of signals received via the antenna(s). In some environments, the communication interface 40 may alternatively or additionally support wired communication. As such, for example, the communication interface 40 may include a communication modem and/or other hardware and/or software for supporting communication via cable, digital subscriber line (DSL), universal serial bus (USB) or other mechanisms.

The activation component 60 may include hardware, software, firmware, and/or a combination thereof, configured to indicate initiation (and/or termination) of desired functionality by the user. For example, the activation component 60 may transmit an activation signal to cause the controller 20 to begin operation of the imaging engine 100, for example to begin illumination by one or more illumination sources, and/or capture by image sensors, one or more images. Additionally or alternatively, the activation component 60 may transmit a deactivation signal to the controller 20 to terminate the corresponding functionality, for example to cease scanning via the image sensor(s). In some embodiments, the activation component 60 is embodied by one or more buttons, triggers, and/or other physical components provided in or on the body of a chassis. For example, in at least one example context, the activation component 60 is embodied by one or more "trigger" components that, when engaged by an operator (e.g., when an operator squeezes the trigger), transmits a signal to the controller 20 to initiate corresponding functionality. In some such embodiments, the activation component may transmit a deactivation signal to the controller 20 to cease such functionality when the component is disengaged by the operator (e.g., when the operator releases the trigger). Alternatively or additionally, in at least some embodiments, the activation component 60 is embodied without any components for direct engagement by an operator. For example, when the imaging system 10 is embodied as an imaging apparatus, the activation component 60 may be embodied by hardware and/or software, or a combination thereof, for detecting the imaging apparatus has been raised and/or positioned to a predefined "scanning" position, and/or lowered from that position to trigger deactivation. Alternatively or additionally, the activation component 60 may be embodied as a user interface element of the imaging system 10. In such embodiments, the activation component 60 embodied as a user interface element may be configured to receive an input from the user on a user interface and in turn transmit a corresponding command to the controller 20.

The one or more peripheral components 80 include other structural and functional elements of the imaging system 10 such as for example a display device, a user interface, a housing, a chassis, power source and the like. One or more of the peripheral components 80 may be controlled by the controller and may operate as per instructions or control provided by the controller 20.

FIG. 1B illustrates an example multi-sensor imaging engine (hereinafter, also referred to as "imaging engine") in accordance with an example embodiment of the present disclosure. Specifically, as illustrated, the example multi-sensor imaging engine is embodied by a multi-sensor imaging engine 100. The multi-sensor imaging engine 100 includes a plurality of image sensors, specifically a near-field image sensor and a far-field image sensor, configured for capturing image data objects in a near field of view associated with the near-field image sensor and a far field of view associated with the far-field image sensor, respectively. In at least one example context, the multi-sensor imaging engine 100 is configured for capturing images for purposes of indicia reading at different ranges, such as a close-range using a near-field image sensor and a far-range using a far-field image sensor.

As illustrated, the multi-sensor imaging engine 100 includes near-field image capture optics 104A. The near-field capture optics 104A may be embodied by one or more lens(es) and/or other optical components configured to enable light to transverse through and interact with a corresponding image sensor, specifically the near-field image sensor 102A. In this regard, the near-field image capture optics 104A may define a particular field of view that may be captured by a near-field image sensor 102A. In some embodiments, the near-field image capture optics 104A defines a near field of view associated with a first focal range, such that objects located at and/or within a determinable offset from the first focal range may be clear in images captured by the near-field image sensor 102A.

Additionally as illustrated, the multi-sensor imaging engine 100 includes far-field image capture optics 104B. The far-field image capture optics 104B may be embodied by one or more lens(es) and/or other optical components configured to enable light to transverse through and interact with a corresponding image sensor, specifically the far-field image sensor 102B. In this regard, the far-field image capture optics 104B may define a second field of view that may be captured by the far-field image sensor 102B. In some embodiments, the far-field image capture optics 104B defines a far field of view that is associated with a second focal range, such that objects located at and/or within a determinable offset from the second focal range may be clear in images captured by the far-field image sensor 102B. In some such embodiments, the near field of view is wider than the far field of view, such that the captured data represents more of the environment within view of the multi-sensor imaging engine 100. The far field of view may be narrower than the near field of view and focused on a further range to enable clearer capture of objects located at a greater range than objects that can be captured clearly in the near field of view. The physical layout of illumination sources, image sensors can be changed in different applications.

In some example embodiments, the near-field imaging sensor 102A may include a global shutter to provide enhanced motion tolerance. The near field imaging sensor 102A may use a large Field of View (FOV), the large FOV enabling applications such as but not limited to optical character recognition (OCR), image reconstruction, machine learning etc. In some embodiments, the far field sensor 102B may include a rolling shutter. The far field image sensor 102B uses a small FOV to improve the sampling of far field. Additionally, each of the near-field image sensor 102A and the far-field image sensor 102B may have an associated focus mechanism. The focus mechanism may include a focus scheme that controls movement of one or more focus lenses along an optical axis direction of an image sensor (102A or 102B). Towards this end, in some embodiments, the focus scheme may include one or more motors for example, stepper motors. The focus scheme may provide a plurality of discrete focus positions in each field of view and the motor may move the focus optics of a particular image sensor to each of the discrete focus positions to exhibit the focus mechanism. For example, in some example embodiments, to change the focusing of the far field image sensor 102B, the corresponding motor may move the associated focus optics of the far field imaging sensor 102B to three discrete focus positions in the far field. The operation of each of the focus mechanisms may be controlled by a processing component such as the controller 20 of FIG. 1A or the processor 202.

In some embodiments, for example as illustrated, each image sensor (or a subset thereof) is associated with one or more components for producing an illumination configured for illuminating the field of view defined by the image sensor. For example, as illustrated, the multi-sensor imaging engine 100 additionally comprises the near-field illumination source 106A and corresponding near-field projection optics 108A. The near-field illumination source 106A may produce illumination pulses constituting a near-field illumination pulse train. That is, the activation of the near-field illumination source 106A occurs for a time period and then the near-field illumination source 106A remains deactivated for a set time period before next activation. The near-field illumination source 106A is configured to produce light in the optical axis direction of the near-field projection optics 108A. This light is refracted through the near-field projection optics 108A to produce a near-field illumination, which may be produced in a desired pattern based on the configuration and design of the near-field projection optics 108A. In this regard, the illumination produced by light exiting the near-field projection optics 108A may illuminate a particular field of view, such as the near field of view capturable by the near-field image sensor 102A. It should be appreciated that in some embodiments, the near-field illumination source 106A and/or near-field projection optics 108A may be designed such that the near field illumination specifically illuminates the near field of view, and may affect the functioning of the far-field image sensor 102B without negatively affecting the functioning of the near-field image sensor 102A. For example, due at least in part to the close proximity between the components, reflected light may interact with the far-field image sensor 102B and negatively affect the images created via far-field image sensor 102B. In some example embodiments, the near-field illumination source 106A may produce the near-field illumination based on one or more illumination pulses constituting a near-field illumination pulse train.

Similarly, the multi-sensor imaging engine 100 additionally comprises the far-field illumination source 106B and corresponding far-field projection optics 108B. The far-field illumination source 106B produces far-field illumination pulses constituting a far-field illumination pulse train. The far-field illumination source 106B is configured to produce light in the direction of the far-field projection optics 108B. This light is refracted through the far-field projection optics 108B to produce a far-field illumination, which may be produced in a desired pattern based on the configuration and design of the far-field projection optics 108B. In this regard, the far-field illumination may illuminate a particular field of view, such as the far field of view capturable by the far-field image sensor 102B. It should be appreciated that the far-field illumination source 106B and/or far-field projection optics 108B may be designed such that the far-field illumination specifically illuminates the far field of view without producing sufficient reflections to negatively impact the operations of the near-field image sensor 102A and/or far-field image sensor 102B.

Additionally or alternatively, optionally in some embodiments, the multi-sensor imaging engine 100 further comprises an aimer illumination source 110. The aimer illumination source 110 is configured to produce light in the direction of the aimer projection optics 112. For example, the aimer illumination source comprises one or more laser diodes and/or high intensity LED(s) configured to produce sufficiently powerful and/or concentrated light. The light is refracted through the aimer projection optics 112 to produce an aimer illumination, which may be produced in a desired pattern based on the configuration and design of the aimer projection optics 112. In one example context, for purposes of barcode scanning for example, the aimer pattern may be produced as a laser line pattern.

The multi-sensor imaging engine 100 further comprises a protective window 114. The protective window 114 comprises one or more optical components configured to enable produced light to exit the engine 100, and incoming light to be received through the image capture optics 104A and 104B to interact with the corresponding image sensors 102A and 102B. In some contexts, the protective window 114 reflects at least a portion of the illumination projected by the far-field projection optics 108B and/or near-field projection optics 108A, and which may interact with the image sensor(s) 102A and/or 102B through light leak or through the corresponding image capture optics 104A and/or 104B. For example, at least a portion of the near field illumination may be reflected towards the far-field image sensor 102B, and negatively affect the operation of the far-field image sensor 102B if triggered when an illumination pulse is occurring. In at least one example context, the far-field illumination source 106B produces light that is concentrated and/or otherwise sufficiently designed such that the far-field illumination produced by the far-field projection optics 108B is not sufficiently reflected to negatively affect the near-field image sensor 102A.

It should be appreciated that, in other embodiments, a multi-sensor imaging engine may include any number of image capture optics, image sensors, illumination sources, and/or any combination thereof. In this regard, the imaging engine 100 may be extended to capture any number of field of views, which may each be associated with a corresponding illuminator designed for specifically illuminating a corresponding field of view. One or more of the illumination source(s) may negatively affect operation of another illuminator. In such circumstances, when one such illumination source is active, the negatively affected image sensor may be activated between illumination pulses of the illumination source as described herein. Such operation may be implemented for any combination(s) of illumination source and image sensor.

In some embodiments, the multi-sensor imaging engine 100 includes one or more processing components (e.g., a processor and/or other processing circuitry) for controlling activation of one or more components of the multi-sensor imaging engine 100. For example, in at least one example embodiment, the multi-sensor imaging engine 100 includes a processor configured for timing the illumination pulses of the near-field illumination source 106A and/or far-field illumination source 106B, and/or controlling the exposing of the near-field image sensor 102B and/or far-field image sensor 102A. In some such contexts, the processor is embodied by any one of a myriad of processing circuitry implementations, for example as a FPGA, ASIC, microprocessor, CPU, and/or the like. In at least some embodiments, the processor may be in communication with one or more memory device(s) having computer-coded instructions enabling such functionality when executed by the processor(s). In some embodiments, it should be appreciated that the processor may include one or more sub-processors, remote processors (e.g., "cloud" processors) and/or the like, and/or may be in communication with one or more additional processors for performing such functionality. For example, in at least one embodiment, the processor may be in communication, and/or operate in conjunction with, another processor within an imaging apparatus, for example the processor 202 as depicted and described with respect to FIG. 2.

FIG. 2 illustrates an example multi-sensor imaging apparatus, in accordance with an example embodiment of the present disclosure. Specifically, FIG. 2 illustrates an example multi-sensor imaging apparatus 200. As illustrated, the multi-sensor imaging apparatus 200 comprises an apparatus chassis 210 for housing the various components of the apparatus. In this regard, it should be appreciated that the apparatus chassis may be embodied in any of a myriad of chassis designs, using any of a myriad of materials, and/or the like, suitable to position the various components of the multi-sensor imaging apparatus 200 for operation. In at least one example context, the apparatus chassis 210 may be embodied as a handheld apparatus chassis, wearable chassis, and/or the like.

The multi-sensor imaging apparatus 200 comprises the multi-sensor imaging engine 100 as described above with respect to FIG. 1B. The multi-sensor imaging apparatus 200 further comprises a processor 202. The processor 202 (and/or any other co-processor(s) and/or processing circuitry assisting and/or otherwise associated with the processor 202) may provide processing functionality to the multi-sensor imaging apparatus 200. In this regard, the processor 202 may be embodied in any one of a myriad of ways as discussed with respect to the controller 20 of FIG. 1A.

In some example embodiments, the processor 202 is configured to provide functionality for operating one or more components of the multi-sensor imaging apparatus 200. For example, the processor 202 may be configured for activating the far-field illumination source 106B, the near-field illumination source 106A, and/or the aimer illumination source 110. Additionally or alternatively, in some embodiments, the processor 202 is configured for activating the near-field image sensor 102A and/or far-field image sensor 102B to expose the corresponding image sensor, and/or for reading out the captured data to generate an image based on the data captured during exposure. Additionally or alternatively, in some embodiments, the processor 202 is configured to process the captured image(s), for example based on one or more image processing task(s). In one such example context, the processor 202 is configured to perform an attempt to detect and decode visual indicia(s), such as 1D and/or 2D barcodes, from a captured image. In this regard, the processor 202 may be configured to utilize a visual indicia parsing algorithm and/or a visual indicia decoding algorithm to provide such functionality.

Additionally or alternatively, optionally in some embodiments, the multi-sensor imaging apparatus 200 further include activation component 206. The activation component 206 may be embodied in a myriad of ways as discussed with respect to the activation component 60 of FIG. 1A.

Additionally or alternatively, optionally in some embodiments, the imaging apparatus 200 further includes a display 208. The display 208 may be embodied by a LCD, LED, and/or other screen device configured for data provided by one or more components of the apparatus 200. For example, in some embodiments, the display 208 is configured for rendering a user interface comprising text, images, control elements, and/or other data provided by the processor 202 for rendering. In some embodiments, for example, the display 208 is embodied by an LCD and/or LED monitor integrated with the surface of the apparatus chassis 210 and visible to an operator, for example to provide information decoded from a barcode and/or associated with such information decoded from a barcode. In one or more embodiments, the display 208 may be configured to receive user engagement, and/or may transmit one or more corresponding signals to the processor 202 to trigger functionality based on the user engagement. In some such embodiments, the display 208 to provide user interface functionality embodying activation component 206, for example to enable an operator to initiate and/or terminate scanning functionality via interaction with the user interface.

Additionally or alternatively, optionally in some embodiments, the dual-imaging apparatus 200 further includes a memory 204. The memory 204 may provide storage functionality, for example to store data processed by the multi-sensor imaging apparatus 200 and/or instructions for providing the functionality described herein. In some embodiments, the processor 202 may be in communication with the memory 204 via a bus for passing information among components of the apparatus, and/or for retrieving instructions for execution. The memory 204 may be embodied in a myriad of ways discussed with reference to the controller 20 of FIG. 1A. The memory 204 may be configured to store information, data, content, applications, instructions, or the like, for enabling the imaging apparatus 200 to carry out various functions in accordance with some example embodiments. In some embodiments, the memory 204 includes computer-coded instructions for execution by the processor 202, for example to execute the functionality described herein and/or in conjunction with hard-coded functionality executed via the processor 202. For example, when the processor 202 is embodied as an executor of software instructions, the instructions may specially configure the processor 202 to perform the algorithms and/or operations described herein when the instructions are executed. Non-limiting examples implementations of the multi-sensor imaging engine 100 and multi-sensor imaging apparatus 200 are described in U.S. patent application Ser. No. 16/684,124 filed Nov. 14, 2019, titled "INTEGRATED ILLUMINATION-AIMER IMAGING APPARATUSES," the contents of which are incorporated by reference in its entirety herein. It should be appreciated that one or more of such components may be configurable to provide the illumination synchronization as described herein.

In some example embodiments of the present disclosure, processor 202 and memory 204 may together be embodied as an imaging control apparatus or an illumination control apparatus and may therefore be fixed or detachably coupled with the imaging apparatus 200 or may be partially or completely outside the imaging apparatus 200. In some embodiments, the imaging control apparatus may be embodied as an integrated circuit that is operatively coupled with the imaging apparatus 200.

FIG. 3 illustrates a visualization of the field of views capturable by an example multi-sensor image apparatus. For example, as illustrated FIG. 3 depicts the near field of view 302 and the far field of view 304 capturable by the multi-sensor imaging apparatus 200. As illustrated, the near field of view 302 is broader than the far field of view, such that more of the environment may be captured within the near field of view 302 than the far field of view 304.

Further, as illustrated, the far field of view 304 extends further than the near field of view 302. In this regard, the narrow nature of the far field of view 304 may enable capture of more detailed representations of a particular portion of the environment as compared to the near field of view 302. In some embodiments, the near field of view 302 and far field of view 304 are capturable by corresponding near field image sensor and a corresponding far field image sensor of the multi-sensor imaging apparatus 200. The near field of view 302 may be associated with a near focal range at a particular distance from the corresponding image sensor in the multi-sensor imaging apparatus 200. Additionally or alternatively, the far field of view 304 may be associated with a far focal range at another distance from the corresponding image sensor in the multi-sensor imaging apparatus 200. In this regard, the near field focal range may be closer than the far-field focal range, such that objects further from the multi-sensor imaging apparatus 200 are in better focus when captured via the far-field image sensor, allowing for an extended range as compared to the near field image sensor.

The multi-sensor imaging apparatus 200 may be configured for providing an illumination specifically for illuminating each of the field of views 302 and 304. In this regard, an illumination source may be specifically designed to match the field of view of a corresponding image sensor, such that the illumination appropriately illuminates the corresponding field of view without overfill or underfill. Utilizing another illumination source to produce an illumination and capturing during the non-corresponding image sensor during the illumination, may result in overfilling (e.g., when capturing using a far-field image sensor during a near-field illumination pulse), and/or underfilling (e.g., when capturing using a near-field image sensor during a far-field illumination pulse) that may affect the quality of the data in the captured image, such as due to having too much illumination and/or not enough as described. For example, FIG. 4 illustrates a visualization of a near-field illumination produced by a multi-sensor imaging apparatus, for example the multi-sensor imaging apparatus 200, in accordance with an example embodiment of the present disclosure. In this regard, the near-field illumination 402 may be produced so as to substantially or entirely illuminate the near field of view 302. The near-field illumination 402 may be produced in accordance with an illumination pattern that sufficiently illuminates the entirety of the near-field of view 302 for capturing.

FIG. 5 illustrates a visualization of a far-field illumination produced by an example multi-sensor imaging apparatus, for example the multi-sensor imaging apparatus 200, in accordance with an example embodiment of the present disclosure. In this regard, the far-field illumination 404 may be produced so as to substantially or entirely illuminate the far field of view 304. The far-field illumination 504 may be produced in accordance with an illumination pattern that sufficiently illuminates the entirety of the far field of view 304 for capturing by a corresponding far-field image sensor. The far-field illumination 504 may illuminate only a percentage of the near-field of view 302, for example a center percentage (e.g., 25%, 50%, or the like) of the near field of view 302. In this regard, the activation of the far-field illumination may be problematic for capturing sufficient images of certain visual indicia, such as those that extend past the boundaries of the far-field of view 304 at a particular distance. Accordingly, utilizing the appropriate illuminator for each image sensor while minimizing flicker and minimizing operational time is desirable to increase the likelihood and efficiency of successful visual indicia detecting and decoding.

FIG. 6 illustrates a timing diagram 600 associated with operational functionality of an example multi-sensor imaging system, in accordance with an example embodiment. The timing diagram 600 illustrates activation and deactivation timings for the various components (e.g., but not limited to a near-field illumination source, a near-field image sensor, a far-field illumination source, a far-field image sensor, a focusing mechanism) of the multi-sensor imaging apparatus 200. Several individual processes associated with the imaging system 10/imaging apparatus 200 are illustrated with the aid of pulses in the timing diagram 600 of FIG. 6. The vertical expanse of a pulse in the timing diagram does not necessarily specify the pulse's amplitude. According to some example embodiments, each pulse in the timing diagram 600 may be defined by a length of active time of an associated component/process followed by a length of inactive time of the associated component/process. Each pulse may have a corresponding period which may be defined as the time duration for which the amplitude of the pulse remains non-zero. The period of a pulse may begin at a start time instance (pulse start time) and end at an end time instance (pulse end time). As used herein, the term start time period of a period of a pulse may refer to a time period of a threshold duration starting from a pulse start time, where the threshold duration may have a configurable value. In an example, the threshold duration may be zero and as such, the start time period of a period and the pulse start time may refer to the same instance in time. Similarly, the term end time period of a period of a pulse may refer to a time period of a threshold duration ending at a pulse end time, where the threshold duration may have a configurable value. In at least one example context, the threshold duration may be zero and as such, the end time period of a period and the pulse end time may refer to the same instance in time. In some example embodiments, the respective threshold durations may be configurable as per one or more performance parameters of the controller 20 and/or the imaging engine 100.

As illustrated in the timing diagram 600, some pulses associated with a particular operation of a particular component of the imaging system 10/imaging apparatus 200 may be temporally aligned, partially or fully overlapped, or may not overlap with one or more other pulses associated with one or more operations of another component of the imaging system 10/imaging apparatus 200. As an example, a start of the near field illumination pulse 602A is temporally aligned with the start of the pulse 604 associated with exposure of the near-field image sensor (also referred to as near-field exposure pulse 604). As another example, the near field illumination pulse 602A may not overlap with the pulse 606 associated with the read-out of the near-field image sensor (also referred to as near-field read-out pulse 606). As another example, the pulse 614A associated with exposure of the far-field image sensor (also referred to as far-field exposure pulse 614A) overlaps with the near-field read-out pulse 606.

Executable instructions corresponding to the operations illustrated in the timing diagram 600 may be utilized by the imaging system/imaging apparatus to perform smooth execution of one or more imaging or image processing tasks. For example, each image sensor activation may comprise two steps to capture a corresponding image: exposing the image sensor and readout from the image sensor. In this regard, it should be appreciated that the processor 202, for example, may be configured to enable activation of the various components based on the timing diagram. According to some example embodiments, the image sensors (102A, 102B) may be operated in a manner such that the exposure period of the far-field image sensor 102B is adjusted or accommodated into the illumination pulse train of the near-field illumination source 106A. Such modification of the illumination pulse train of the near-field illumination source 106A to accommodate the exposure period of the far-field image sensor 102B may be accomplished by various ways, some examples of which will be discussed with reference to FIGS. 8-10.

As illustrated, the timing diagram 600 includes a near-field illumination pulse train 602 used by the near-field illumination source 106A for producing a near-field illumination. The near-field illumination pulse train 602 comprises a plurality of illumination pulses such as illumination pulse 602A, 602B, 602C, 602D, and 602E. It should be noted that in the unmodified form, the near-field illumination pulse may only comprise illumination pulses similar to illumination pulse 602A which are produced at a certain fixed frequency. Illumination pulses similar to the additional illumination pulses 602B-602E may be added by the controller 20 or processor 202 to accommodate the exposure period 614 of the far-field image sensor 102B, in the near-field illumination pulse train 602, to alleviate the illumination problems associated with the multi sensor imaging apparatus 200/system 10. In this regard, each near-field illumination pulse may be defined by a length of active time (e.g., near-field illumination source 106A on-time), followed by a length of inactive time (e.g., near-field illumination source 106A off-time). In an example context, the multi-sensor imaging apparatus 200 may be configured to periodically produce the near-field illumination pulses 602A with an on-time of 1.5 milliseconds ("ms"), followed by an off-time of 14.5 ms. In this regard, each illumination pulse 602A may begin, last for 1.5 ms, and subsequently end before another illumination pulse 602A begins after 14.5 ms elapses. To avoid occlusion, only one illumination pulse 602A is shown in the near-field illumination pulse train 602. However, it may be contemplated that as per the example embodiments described herein, the near-field illumination pulse train 602 in its unmodified form comprises a plurality of such illumination pulses 602A. The near-field illumination source 106A may produce the additional illumination pulses 602B-602E in a similar manner as described above with same or different on-times and off-times. Each of the illumination pulses 602A-602E may extend in time domain for a duration referred to as an illumination period. In the example embodiment described above, for example, each illumination pulse 602A may have an illumination period equal to 1.5 milliseconds. The illumination period of an illumination pulse may begin at a first time instance and end at a second time instance. As such, the first time instance may correspond to the illumination pulse start time of the illumination pulse and the second time instance may correspond to the illumination pulse end time of the illumination pulse.

In some example embodiments, the near-field image sensor 102A and far-field image sensor 102B may each be activated while the near-field illumination is produced. As illustrated, the exposure pulse 604 of the near-field image sensor may be fully or substantially aligned with the near-field illumination pulse 602A of the near-field illumination pulse train 602. That is, the exposure of the near-field image sensor during the exposure period 604 may begin simultaneously with a start time period of the near-field illumination pulse 602A of the near-field illumination pulse train 602. In some example embodiments, an end time period of the exposure period 604 may extend beyond the end time period of the near-field illumination pulse 602A of the near-field illumination pulse train 602. For example, as illustrated, the near-field image sensor exposure begins at the rising edge of the exposure pulse 604, which is aligned with the rising edge of the first near-field illumination pulse 602A. The exposure of the near-field image sensor 102A ends at a time instance that is beyond the falling edge of the first near-field illumination pulse 602A. In this regard, the near-field image sensor 102A is exposed during the entirety (or near entirety) of the first near-field illumination pulse 602A, maximizing the likelihood of capturing sufficient data to enable successfully completing an image processing task such as barcode scanning.

It should be appreciated that, in some embodiments, the illumination pulse may occur during any point in the exposure of an image sensor when it is desired that the image sensor be exposed during the illumination pulse. For example, in a circumstance where the near-field image sensor 102A is to be exposed during a near-field illumination pulse, the exposure may begin before the illumination pulse or the illumination pulse may occur at a later time during the exposure. As one such example, in the context where the near-field image sensor 102A is associated with a 4.5 ms exposure time value, and each near-field illumination pulse lasts 1.5 ms, the exposure of the near-field image sensor 102A could begin at any time between the beginning of the illumination pulse and 3 ms before the illumination pulse start time, such that the entirety of the illumination pulse occurs during the exposure. It should be appreciated that the specific timing may differ for any combination of differently configured image sensor(s) and/or illumination source(s).

As illustrated, the near-field image sensor 102A is subsequently read out in pulse 606 to generate and/or process a corresponding image (e.g., a first near-field image) in pulse 608. Parallel to the start of the read-out from the near-field image sensor 102A in pulse 606, the exposure of the far-field sensor 102B may begin at pulse 614. Thereafter, with end of the exposure of the far field sensor 102B in pulse 614, the read-out from far-field sensor may begin at pulse 616 to generate and/or process a corresponding image (e.g., a first far-field image) in pulse 618.

It should be noted that in some example embodiments, a start time period of the exposure period of the pulse 614 may be fully or substantially aligned with a start time period of the read-out period of the pulse 606. Further, an end time period of the exposure period of the pulse 614 may be fully or substantially aligned with a start time period of the read-out period of the pulse 616.

The timing of the illumination pulse(s), corresponding exposure, read-out and/or processing may be determined in any one of a myriad of ways. For example, in at least one example embodiment, the timings for activation of the illumination pulse(s) and/or image sensor exposure(s) may be predetermined and/or hard coded for execution by one or more associated processor(s). Additionally or alternatively, in some embodiments, a timing offset until a next illumination pulse may be determined based on the pulse frequency for the produced illumination, and/or a start time of the illumination pulse (e.g., a time at which a first illumination pulse was produced). The exposure of one or more image sensors may be appropriately timed based on a known and/or determinable current time, an illumination pulse frequency, the determined offset, and/or the exposure time value for the image sensor to be exposed. For example, based on such data, exposure of an image sensor may be triggered such that the image sensor remains exposed for the entirety of an illumination pulse in some circumstances, and/or remains exposed entirely or partially between illumination pulses in other circumstances.

Each illumination source is utilized to illuminate a desired field of view for capture by corresponding image sensor(s), increasing the likelihood of successfully completing an image processing task such as barcode scanning.

FIG. 7 illustrates a flowchart depicting example operations of a process 700 for illumination control in a multi-imager environment, in accordance with an example embodiment of the present disclosure. FIG. 7 will be described in conjunction with the timing diagram 600 illustrated in FIG. 6. Process 700 may be implemented by the imaging system 10 or imaging apparatus 200 described with reference to FIG. 1A and FIG. 2. The process 700 includes at 702, operating, by the controller 20/processor 202, a first illumination source based on a first illumination pulse train. The first illumination source can correspond to a light source associated with a near field sensor. As an example, the first illumination source may be the near-field illumination source 106A described in reference to FIG. 1B-FIG. 2. The first illumination source may illuminate a near-field of view of the near-field image sensor in accordance with the first illumination pulse train. The first illumination pulse train may correspond to the near-field illumination pulse train 602 illustrated in the timing diagram of FIG. 6. In some example embodiments, the first illumination pulse train may have a constant pulse frequency of around 60-90 Hz to produce short, bright pulses of illumination. In some sensitive applications, the pulse frequency may be set to a constant value beyond 90 Hz.

The process 700 further includes at 704, determining, by the controller 20/processor 202, a first exposure period of a second image sensor. In some example embodiments, the second image sensor may be the far-field image sensor 102B and as such, the first exposure period may correspond to an exposure period of the far-field sensor 102B. Illumination and exposure of the second image sensor may be controlled or caused by a control or processing medium such as the controller 20 or processor 202. Accordingly, the first exposure period of the second image sensor may be predetermined and/or hard coded for execution by one or more associated processor(s). In some example embodiments, the exposure period may be dynamically computed based on one or more imaging parameters associated with the second image sensor.

The process 700 further includes at 706, modifying, by the controller 20/processor 202, one or more characteristics of the first illumination pulse train to accommodate the first exposure period of the second image sensor. By modifying the one or more characteristics such as pulse frequency of the first illumination pulse train, the process 700 provides an efficient measure for inhibiting the "illumination spill" from the far-field image sensor into the near-field image sensor and vice versa. The modification of the one or more characteristics of the first illumination pulse train may be performed with the objective of reducing illumination interference amongst the image sensors of the imaging system. Accordingly, one or more characteristics of the first illumination pulse train may be modified in a myriad of ways. In some example embodiments, one or more additional illumination pulses may be added or inserted into the first illumination pulse train to avoid the illumination interference with exposure of the second image sensor, a detailed description of which has been provided with reference to processes 706A and 706B of FIGS. 8 and 9 respectively. Additionally or alternatively, in some example embodiments, the timing delay between a pair of temporally subsequent illumination pulses of the first illumination pulse train may be increased to avoid the illumination interference with exposure of the second image sensor, a detailed description of which has been provided with reference to process 706C of FIG. 10.

The process 700, at 708 includes operating, by the controller 20/processor 202, the first illumination source associated with the first image sensor, based on the modified first illumination pulse train. Thus, the controller 20/processor 202 controls subsequent activation of the near-field illumination source based on the modified near-field illumination pulse train. The exposure of the near-field image sensor is accordingly aligned with the illumination pulses of the modified near-field illumination pulse train to perform the image capture by the near-field image sensor. Since the modified near-field illumination pulse train is generated considering the exposure period of the far-field image sensor, the likelihood of an illumination spill amongst the two sensors is reduced or in some cases eliminated. Therefore, the process 700 provides an efficient measure to operate a multi-sensor imaging system/apparatus. Accordingly, an apparatus executing or utilizing the process 700 results in improvements in imaging and/or subsequent image processing tasks.

FIG. 8 illustrates a flowchart depicting example operations of a process 706A for modifying one or more characteristics of the first illumination pulse train to accommodate a first exposure period of the second image sensor of an example multi-sensor imaging system, in accordance with at least one example embodiment of the present disclosure. In some example embodiments, the process 706A may be triggered in scenarios where illumination synchronization is required along with flicker control or elimination.

Process 706A includes at 802, determining, by the controller 20/processor 202, a start time period and an end time period of the first exposure period of the second image sensor. As described previously, the second image sensor may be the far-field image sensor 102B. As such, the controller 20/processor 202 may determine the metes and bounds of the exposure period of the far field image sensor. Furthermore, as discussed with reference to step 704 of FIG. 7, the first exposure period of the second image sensor may be predetermined and/or hard coded for execution by one or more associated processor(s). In some example embodiments, the exposure period may be dynamically computed based on one or more imaging parameters associated with the second image sensor. The controller 20/processor 202 may obtain data regarding the exposure period of the far field image sensor from any of the above-mentioned sources and determine the start-time period and end time period of the exposure period.

At step 804, process 706A includes generating, by the controller 20/processor 202, at least one additional illumination pulse for the first illumination pulse train of the first image sensor. The at least one additional illumination pulse may be generated for inserting it into the first illumination pulse train. Accordingly, process 706A further incudes at 806, inserting, by the controller 20/processor 202, the at least one additional illumination pulse into the first illumination pulse train such that the start time period and/or an end time period of the illumination period of the at least one additional illumination pulse is aligned with the start time period and/or an end time period of the first exposure period of the second image sensor. That is, the at least one additional illumination pulse may be added or inserted into one or more "don't care regions" of the pulse corresponding to the exposure period of the second image sensor. The "don't care regions" may correspond to such portions of the exposure period in which an object or a portion thereof is not captured. As discussed, the second image sensor may be a far field image sensor and in usual scenarios an initial window and a terminal window associated with the pulse corresponding to the exposure period of the far field image sensor may not be associated with capture of an object because the object is usually captured within a center window of the exposure period of the far field image sensor. Thus, in the example illustrated herein, the initial and terminal windows of the exposure period may correspond to the don't care regions. It may however be contemplated that additionally or alternatively, any other portion of the exposure period may as well be defined as the don't care region within the scope of this disclosure.

As shown in FIG. 6, the one or more additional illumination pulses 602B and 602E (shown in fine dotted lines) are generated and inserted into the near-field illumination pulse train 602 such that a start time period of the illumination period of the illumination pulse 602B is aligned with a start time period of the exposure period 614A of the far-field image sensor, and a start time period of the illumination period of the illumination pulse 602E is aligned with a start time period of the exposure period 614B of the far-field image sensor.

FIG. 9 illustrates a flowchart 706B depicting example operations of another process for modifying one or more characteristics of the first illumination pulse train to accommodate the first exposure period of the second image sensor of an example multi-sensor imaging system, in accordance with at least one example embodiment of the present disclosure. In some example embodiments, the process 706B may be triggered in scenarios where illumination synchronization is required along with flicker elimination.

Process 706B includes at 902, determining, by the controller 20/processor 202, an autofocus period of the second image sensor. During operation of the second image sensor for imaging in the far field, it is required that the image sensor be moved to one of several focus positions. The shift from an initial position of the image sensor (and/or associated optics) to one of the focus positions occurs during an autofocus period. The autofocus period may be predefined and stored in a memory of the imaging engine or may be dynamically computed based on one or more imaging parameters. In either case, the controller 20/processor 202 may obtain or otherwise calculate the autofocus period.

At step 904, process 706B includes generating, by the controller 20/processor 202, at least one additional illumination pulse for the first illumination pulse train of the first image sensor. The at least one additional illumination pulse may be generated for inserting it into the first illumination pulse train. Accordingly, process 706B further incudes at 906, inserting, by the controller 20/processor 202, the at least one additional illumination pulse into the first illumination pulse train such that illumination of the first image sensor corresponding to the at least one additional illumination pulse temporally overlaps the autofocus period of the second image sensor. That is, the at least one additional illumination pulse may be added or inserted into the first illumination pulse train in positions aligned with a period of motor movement of the second image sensor.

As shown in FIG. 6, the one or more additional illumination pulses 602D (shown in thick dotted lines) are generated and inserted into the near-field illumination pulse train 602 such that the illumination period of the illumination pulse 602D overlaps the autofocus motor move pulse 610.

FIG. 10 illustrates a flowchart depicting example operations of another process 706C for modifying one or more characteristics of the first illumination pulse train to accommodate the first exposure period of the second image sensor of an example multi-sensor imaging system, in accordance with at least one example embodiment of the present disclosure. Process 706C includes at 1002, determining, by the controller 20/processor 202, a start time period and an end time period of the first exposure period of the second image sensor. As described previously, the second image sensor may be the far-field image sensor 102B. As such, the controller 20/processor 202 may determine the metes and bounds (start time period and end time period) of the exposure period of the far field image sensor. Furthermore, as discussed with reference to step 704 of FIG. 7, the first exposure period of the second image sensor may be predetermined and/or hard coded for execution by one or more associated processor(s). In some example embodiments, the exposure period may be dynamically computed based on one or more imaging parameters associated with the second image sensor. The controller 20/processor 202 may obtain data regarding the exposure period of the far field image sensor from any of the above mentioned sources and determine the start-time period and end time period of the exposure period.

Process 706C further includes at 1004, determining, by the controller 20/processor 202, a pair of temporally subsequent illumination pulses of the first illumination pulse train that are in closest temporal vicinity of the first exposure period of the second image sensor. The controller 20/processor 302 may determine the start time instance and end time instance of the exposure period of the far field image sensor. The controller 20/processor 302 may map the determined start time instance and end time instance of the exposure period onto the near-field illumination pulse train to determine a pair of temporally subsequent illumination pulses in the near-field illumination pulse train that are in closest vicinity of the determined start time instance and end time instance of the exposure period, respectively, on a time axis.

Process 706C further includes at 1006, increasing, by the controller 20/processor 202, a timing delay between the qualified pair of temporally subsequent illumination pulses of the first illumination pulse train such that one of the start time period or the end time period of the first exposure period is aligned with a respective one of a start time period or an end time period of the increased timing delay. As is illustrated in the example timing diagram 1100 of FIG. 11, illumination pulse pair 1104, 1106 and illumination pulse pair 1108, 1110 of the near-field illumination pulse train may be selected as the qualified pair of temporally subsequent illumination pulses that are in closest vicinity to the start time instance and end time instance of the exposure period 1112. Accordingly, the controller 20/processor 302 may increase a timing delay between the illumination pulses (1102-1110) such that the start time period and/or the end time period of the exposure period 1112 is aligned with a respective one of a falling edge of the illumination pulse 1104 and a rising edge of the illumination pulse 1106, respectively. The falling edge of the illumination pulse 1104 may be within a threshold delay from the start time period of the exposure period 1112 and the rising edge of the illumination pulse 1106 may be within another threshold delay from the end time period of the exposure period 1112. Similar modifications to other pulses of the exposure period may be made to align with a corresponding pair of illumination pulses. The time duration between the rising edge of the illumination pulse 1104 and the falling edge of the illumination pulse 1106 defines the increased timing delay. Thus, as is illustrated in the modified near field illumination pulse train of FIG. 11, the start time period and the end time period of the exposure period 1112 of the far-field image sensor is aligned with a respective one of a start time period or an end time period of the increased timing delay.

FIGS. 12A and 12B illustrate an example workflow of a symbol decoding process executed by an example multi-sensor imaging system, in accordance with at least one example embodiment of the present disclosure. In some example embodiments, the imaging system 10 and/or the imaging apparatus 200 may include or be a part of an exemplary symbol reading device such as an indicia reader. Processes 1200A, 1200B, and 1200C as illustrated in FIGS. 12A, 12B, and 12C provide a symbol decoding method that includes various aspects of the method 700. A symbol reader having multiple image sensors, when implementing the processes 1200A, 1200B, and 1200C is able to mitigate the problems arising out of illumination spill as well as flicker and is thus able to provide error free or reduced error capture of images of the symbol. This results in faster and efficient decoding of the symbol. Further advantages of the workflow will become evident through the following disclosure of the workflow.

Some or all the steps of processes 1200A, 1200B, and 1200C may be carried out by appropriate data processing means and control means. For example, in some example embodiments, the processes 1200A, 1200B, and 1200C may be carried out by a controller or one or more processors of the symbol reader. In some example embodiments, the controller of the symbol reader may be embodied in a manner similar to that described with reference to controller 20 of the imaging system 10.

The process 1200A is triggered upon receipt of an input from a user on the activation component 206 of the imaging apparatus 200. In response, process 1200A begins at 1202 by turning on the aimer as an indicator. As described in reference to FIG. 2, the aimer illumination source 110 and the aimer projection optics 112 may together produce the aimer as a desired pattern. Next, at 1204, the process 1200A includes turning on the near-field illumination. The near-field illumination may be produced in a variety of ways, for example as discussed previously in the disclosure. In some example embodiments, the near-field illumination is produced according to a near-field illumination pulse train having a fixed pulse frequency. The individual near-field illumination pulses may be of short durations such as 1.5 ms.

The exposure of the near-field image sensor begins at 1206 substantially simultaneously with the activation of the near-field illumination source. In some example embodiments, the near-field image sensor may include a global shutter and may have a large field of view. In some example embodiments, the near-field image sensor may include a rolling shutter. Subsequently, at 1208, the process 1200A may include transferring the data from the near field image sensor to capture a first near field image. That is, the charges may be read-out to construct an image frame captured by the near-field image sensor.

Parallel to step 1208, at 1210, the process 1200A includes starting the exposure of the far field image sensor in the far field. In some example embodiments, the far-field image sensor may include a rolling shutter and may have a narrow field of view in comparison to the near-field image sensor. After the exposure period of the far-field image sensor has lapsed, the data transfer from the far-field image sensor may begin at 1212 to capture a first far-field image.

At 1214, upon capture of the first near-field image, process 1200A includes processing the first near-field image and starting a first decode run. The first near-field image is processed to get a distance estimation of a target symbol in the image. Towards this end, any suitable image processing-based distance estimation technique (for example, but not limited to using the parallax-based technique or the disparity in sharpness of images from the near-field image sensor and the far field image sensor) may be utilized. For example, as a binary test, it may be determined from the decoding results of the first decoding run, whether the target symbol was successfully captured or not in the first near-field image. The results of distance estimation may be used to decide whether the first far-field image is to be used for decoding the symbol instead of the first near-field image. In example scenarios where the target symbol is located beyond a maximum imaging range of the near-field image sensor, the captured first near-field image frame may not be indicative of the target symbol with acceptable levels of clarity, brightness, contrast etc. As such, the near-field imaging may not be an appropriate means for decoding the symbol. In such cases, the far-field image sensor may be relied upon to attempt a successful decode.

The process 1200A at 1216 includes, determining whether the symbol was successfully decoded in the first decoding run. If the symbol is successfully decoded from the first near-field image, processing of the first far-field image may not be required and the control of steps passes to step 1246 of FIG. 1200C where the decoded symbol may be output by the symbol decoder. However, if at 1214 the symbol is not successfully decoded by the symbol decoder, the process 1200A includes at 1218, moving the imaging engine and thereby the far-field image sensor to a corresponding focus position. The movement to the corresponding focus position includes determining the particular focus position from a set of focus points based on the distance estimated in step 1214. The focus positions of an image sensor may be defined discretely as discrete steps to be traversed by a focus motor of the imagine engine. Subsequent to the movement of the imaging engine at 1218, the control of steps passes to two parallel flows illustrated in process 1200B of FIG. 12B.

Process 1200B includes a first flow comprising steps 1220-1232 aimed at processing and imaging using the far-field image sensor and a second flow comprising steps 1234-1242 aimed at imaging using the near field image sensor. In some example embodiments, the second flow comprising steps 1234-1242 may be skipped in one or more iterations of the processes 1200A, 1200B, and 1200C.

Process 1200B includes at 1220, processing a far-field image (in this case the first far-field image) and starting the second decoding run. The first far field image may be processed to decode the target symbol and alongside other parameters of the image may be obtained by the processing. The other parameters may be such as brightness of the first far-field image. Using these parameters, one or more sensor parameters of the far-field image sensor to be adjusted may be determined. Subsequently, at 1222 it is determined whether the symbol is successfully decoded in the second decoding run. If the result of the check at 1222 is positive (yes), the control of steps passes to step 1246 of FIG. 1200C where the decoded symbol may be output by the symbol decoder. However, if at 1222 the symbol is not successfully decoded by the symbol decoder, the control of steps passes to 1224 where it is determined whether illumination in the far-field is required or not. Such a determination may be made for example by any suitable image processing technique on the first far-field image. If it is determined that far-field illumination is required, the far-field illumination source may be turned on at 1226 and control may pass to step 1228. However, if far-field illumination is not required, control may directly pass to step 1228. At 1228, the exposure of the far-field sensor begins with or without illumination in the far-field, as the case may be. Subsequently, the transfer of data from the far-field image sensor may be completed at 1230 to obtain a second far-field image. The second far-field image may be processed at 1232 and the third decoding run is attempted. Next, the control passes to step 1244 of process 1200C illustrated in FIG. 7C.

In the parallel second flow of process 1200B, upon the determination that the symbol cannot be decoded successfully by the symbol decoder, the near-field illumination pulses are modified at 1234 to accommodate one or more exposure periods of the far-field image sensor. Modification of the near-field illumination pulses may be achieved by modifying the near-field illumination pulse train in a myriad of ways as discussed with reference to FIGS. 8-10. Subsequently, at 1236, the near-field illumination is started as per the modified near-field illumination pulses and at 1238 the near-field image sensor may be exposed in the near-field. Illumination and exposure of the near-field image sensor post modification of the illumination pulses may be achieved in a manner similar to that described at steps 1204 and 1206 respectively. At 1240, the process 1200B includes starting the data transfer of the near-field image sensor to capture a second near-field image. At 1242, the second near-field image may be processed, and the fourth decoding run may be attempted by the symbol decoder. Next, the control passes to step 1244 of process 1200C illustrated in FIG. 7C.

At 1244, it is determined whether the symbol is decoded in any one of the third decoding run at 1232 or the fourth decoding run 1242. If the symbol decoder is able to successfully decode the target symbol from any one of the second far-field image or second near-field image, the control of steps passes to 1246 where the decoded symbol is output by the symbol decoder. However, if at 1244 it is determined that the symbol is not successfully decoded by the symbol decoder, control passes to 1248 where it is determined whether there remains any focus position that is not yet visited. That is, the process 1200C includes determining if amongst the focus positions of the far-field image sensor, there is any focus position from where imaging in the far-field is not yet performed in any of the iterations. If there remains no such focus position from where imaging in the far-field is not yet performed (that is all focus positions have been visited), it is concluded that the target symbol is out of an imaging range of the symbol decoder or there is no target symbol in the imaged field of view. Accordingly, at 1250 an error message may be output indicating that the target symbol is not decodable by the symbol decoder. If, however, at 1248 it is determined that there remains one or more focus positions that are not yet visited, control passes to 1252 where the imaging engine is moved in the far-field to the corresponding position not yet visited. The movement of the imaging engine may be performed in a manner similar to the one described with reference to step 1218 of FIG. 12B. The movement to a focus position may be scheduled in an ascending order (i.e. moving from a nearer-focus position to a farther-focus position amongst the discrete focus positions of the far-field image sensor). Subsequently, the control returns to the two parallel flows of process 1200B at steps 1220 and 1234.

In this way, the exemplar workflow illustrated in FIGS. 12A-12C may be utilized to perform symbol decoding by the symbol decoder, whereby owing to the improved illumination control provided by modification of the near-field illumination pulses (pulse train), the likelihood of successfully decoding the target symbol from the near-field image and far-field image is increased significantly. Such an improvement in the decoding process brings about an improvement in the overall functionality of the symbol decoder device itself.

Although the exemplar workflow illustrated in FIGS. 12A-12C has been described considering an end application as symbol decoding, it may be contemplated that within the scope of this disclosure, other end application tasks utilizing dual or multiple image sensors (and thereby multiple illumination sources) may as well be modified to benefit from the improved illumination control and synchronization framework provided herein. That is, in no way should the scope of the disclosure be limited to symbol decoders alone and suitable modifications may be made to extend the illumination control framework to similar end use cases such as multi-camera based mobile phones. In some example contexts, the multi-image sensor device may be embodied as a smartphone having at least two cameras. The cameras may have a same or separate illumination source associated with each of them. At least one camera in the smartphone may be considered as a primary camera which is associated with image capture in bright, well lit, as well as low lit scenarios. The image quality of such cameras may be directly associated with the megapixel (MP) strength and as such in some example embodiments, the primary camera may have 12, 24, 48 or 64 MP. One or more other cameras in the smartphone may be considered as secondary cameras associated with one or more image enhancement functions. For example, the smartphone may have a telephoto lens supporting ultra-zoom options. In some example embodiments, the telephoto lens may support a zoom factor that ranges between 2× to 10×. In some more advanced embodiments, the smartphone may have an ultra-wide angle lens for enhancing the field of view of the smartphone. Additionally or optionally, in some example embodiments, the smartphone may include a depth sensor to measure the depth of background subjects in comparison with primary subjects in the field of view. One or more cameras of the smartphone may have a different illumination requirement to support universal imaging capabilities for the smartphone. For example, while the primary camera may require illumination flash for imaging in low lit scenarios, the monochrome lens of the smartphone may witness a spike in the brightness during imaging in the same pulse. As such, the resultant image may be compromised in terms of one or more imaging parameters.

Example embodiments described herein help in alleviating the aforesaid problems by providing an effective solution aimed at synchronizing the illumination for the multiple cameras in the smartphone. Particularly, as is illustrated in FIGS. 6-12C the exposure of one or more cameras may be designed or adjusted to overlap or lie outside the exposure of one or more other cameras, as the requirement may be. Since the example embodiments also provide an adaptive process for illumination synchronization, the proposed solutions apply to a wide variety of imaging scenarios and situations.

In some example embodiments, in multi-imager environments such as a multi-image sensor device, cycling between illumination sources (for example the near-field illumination source and the far-field illumination source) during symbol reading/decoding may introduce a flickering effect to an operator of the multi-image sensor device. As such, the illumination control framework may also include one or more frameworks for flicker reduction. FIG. 13 illustrates an example workflow of a general flicker reduction process 1300 executed by an example multi-sensor imaging system, in accordance with at least one example embodiment of the present disclosure.

At 1302, the process 1300 includes operating a first illumination source associated with a near field sensor, based on a first illumination pulse train. The first illumination source may be the near-field illumination source 106A discussed with reference to FIG. 2. Accordingly, the first source illumination source may be operated in accordance with a near-field illumination pulse train such as the near-field illumination pulse train 602 of FIG. 6 or the near-field illumination pulse train of FIG. 11. The first near-field illumination source may be configured to produce pulsed illumination in the near-field of the imaging engine. Each individual pulse may be of a short duration such as 1.5 ms and may be periodic or non-periodic with other illumination pulses of the pulse train.

At 1304, the process 1300 includes causing exposure of the near field sensor during a first exposure period. the start time period of the first exposure period may be substantially or fully aligned with a start time period of an illumination period of the first illumination source. That is, the exposure of the near-field image sensor may commence substantially simultaneously with activation of the first illumination source as shown in the timing diagram 1100 of FIG. 11. The exposure of the near-field image sensor may last for a period that ends beyond end of the illumination period of the first illumination source (i.e. beyond an activation period of the first illumination source).

At 1306, the process 1300 includes causing exposure of a far field sensor during a second exposure period, that does not overlap with any illumination period of the first illumination source. For example, the far-field image sensor of the imaging apparatus 200/imaging system 10 may be exposed during a second exposure period. The start time period and the end time period of the second exposure period of the far-field image sensor may be scheduled in such a way that they do not overlap with the illumination period of any illumination pulse of the near-field illumination pulse train. That is, the exposure of the far-field image sensor may occur during a time period when the first illumination source is deactivated.

In this way, modifying the near-field illumination pulse train to accommodate the far-field exposure period ensures that illumination spill from far-field illumination does not occur into the exposure of the near-field image sensor and vice versa. Because the far-field image sensor is exposed only during periods of deactivation of the near-field illumination source, there is no interference from the near-field illumination source in the exposure of the far-field image sensor. Also, such an arrangement ensures that the illuminations (near-field illumination and far-field illumination) are produced substantially in sequence (i.e. no or very less time gap between the near-field illumination activation and far-field illumination activation for successive pulses). Thus, an operator is not able to perceive a noticeable flicker caused by dimming and brightening of the illumination sources.

In some example embodiments, the target to be captured may be at a considerable distance from the imaging engine. As such, capture of the target may be accomplished using the far-field image sensor. Further, such a scenario may amount to imaging from the farthest focal point (shortest focus) of the far-field image sensor which requires the longest exposure of the far-field image sensor, for example when the far-field image sensor includes a rolling shutter. In such scenarios, keeping the far-field illumination source activated for a long time duration may introduce several issues with operation of the imaging engine such as excessive heat caused due to extended activation of the far-field illumination source. Accordingly, for such scenarios a framework that reduces activation time of the far-field illumination source while ensuring that the far-field imaging is not compromised may be desired. FIG. 14 illustrates an example workflow of a flicker reduction process 1400, specifically for extended far field exposures, executed by an example multi-sensor imaging system, in accordance with at least one example embodiment of the present disclosure.

Process 1400 includes at 1402, operating a first illumination source associated with a near field sensor, based on a first illumination pulse train. Step 1402 may be executed in a manner similar to step 1302.

Process 1400 includes at 1402, causing exposure of the near field sensor during a first exposure period, the start time period of the first exposure period being aligned with a start time period of an illumination period of the first illumination source. Step 1402 may be executed in a manner similar to step 1304.

Process 1400 further includes at 1406, causing exposure of a far field sensor during a second exposure period, the second exposure period overlapping with at least one illumination period of the first illumination source. For example, the far-field image sensor of the imaging apparatus 200/imaging system 10 may be exposed during a second exposure period. In some example embodiments, the start time period or the end time period of the second exposure period of the far-field image sensor may be scheduled in such a way that the start time period or the end time period of the second exposure period of the far-field image sensor is fully or substantially aligned with a start time period or end time period of an illumination period of an illumination pulse pf the near-field illumination pulse train. For example, as is shown in FIG. 6, the start time period of the far-field exposure pulse 614A is aligned with the illumination pulse 602B of near-field illumination pulse train 602.

In example contexts where the target to be captured falls in the center region of the field of view of the far-field image sensor, to extend the exposure time of the far-field image sensor the exposure can be modified so at most only a small number of the top and bottom rows of the rolling shutter based-far-field image sensor are exposed while the near-field illumination source is activated. This minimizes the reflections and light leakage/illumination spill to the outer top and bottom areas of the far-field images ensuring that a minimum size region which in such contexts falls in the center region of the field of view of the far-field sensor does not receive illumination from the near-field illumination source because it would interfere with automatic gain control operations and general decoding. Thus, the resultant captured image is free from any adverse effect that might have been introduced due to the illumination spill from the near-field illumination source.

It may be contemplated that within the scope of this disclosure, the minimum size region may be configurable by an operator/administrator of the imaging engine if the target to be captured falls in a region other than the center region of the field of view of the far-field image sensor. That is, the minimum size region may be defined according to position of the target to be captured in the field of view of the far-field image sensor.

In this way, example embodiments of the flicker reduction process of FIG. 14 provide efficient reduction in the perceivable flicker to an operator by ensuring overlap between the exposure period of the far-field image sensor and the illumination period of the near-field illumination source.

It will be understood that each block of the flowcharts and combination of blocks in the flowcharts illustrated above in FIGS. 7, 8, 9, 10, 12A, 12B, 12C, 13, and 14 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor of the imaging apparatus/system. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions/operations. It will also be understood that one or more blocks of the flowcharts, and combinations of blocks in the flowcharts, can be implemented by special purpose hardware-based computer systems which perform the specified functions, or combinations of special purpose hardware and computer instructions.

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or a combination of one or more of them. The apparatus and execution environment can realize various computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code).

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. An imaging system, comprising:
   a first illumination source associated with a first image sensor, wherein the first illumination source is configured to operate based on a first illumination pulse train;
   a second image sensor; and
   a controller comprising processing circuitry, the controller communicatively coupled to the first illumination source, the first image sensor and the second image sensor, wherein the controller is configured to:
   determine a first exposure period of the second image sensor; and
   modify one or more characteristics of the first illumination pulse train to accommodate the first exposure period of the second image sensor, wherein the one or more characteristics of the first illumination pulse train comprises a pulse frequency of the first illumination pulse train.

2. The imaging system of claim 1, wherein to modify the one or more characteristics of the first illumination pulse train, the controller is further configured to insert at least one additional illumination pulse in the first illumination pulse train such that one of a start time period or an end time period of an illumination period of the at least one additional illumination pulse is aligned with a respective one of a start time period or an end time period of the first exposure period of the second image sensor.

3. The imaging system of claim 1, wherein to modify the one or more characteristics of the first illumination pulse train, the controller is further configured to insert at least one additional illumination pulse in the first illumination pulse train such that illumination of the first image sensor corresponding to the at least one additional illumination pulse temporally overlaps an autofocus period of the second image sensor.

4. The imaging system of claim 1, wherein to modify the one or more characteristics of the first illumination pulse train, the controller is further configured to increase a timing delay between a pair of temporally subsequent illumination pulses of the first illumination pulse train such that one of a start time period or an end time period of the first exposure period is aligned with a respective one of a start time period or an end time period of the increased timing delay.

5. The imaging system of claim 1,
wherein the first image sensor is exposed during at least a second exposure period,
wherein the exposure of the first image sensor during the second exposure period begins simultaneously with a start time period of a first illumination pulse of the first illumination pulse train, and
wherein an end time period of the second exposure period extends beyond an end time period of the first illumination pulse of the first illumination pulse train.

6. The imaging system of claim 1, wherein the controller is further configured to:
obtain an image frame captured by exposure of the second image sensor during the first exposure period;
determine a brightness of the image frame; and
activate a second illumination source associated with the second image sensor, based on the determined brightness of the image frame, wherein the second illumination source is configured to operate based on a second illumination pulse train.

7. The imaging system of claim 1, wherein exposure of the first image sensor begins simultaneously with activation of the first illumination source.

8. The imaging system of claim 7, wherein the second image sensor remains deactivated during a first illumination period of a first illumination pulse of the first illumination pulse train.

9. The imaging system of claim 7, wherein the second image sensor is exposed during a part of a second illumination period of a second illumination pulse of the first illumination pulse train.

10. An imaging method, comprising:
operating a first illumination source associated with a first image sensor, based on a first illumination pulse train;
determining a first exposure period of a second image sensor; and
modifying one or more characteristics of the first illumination pulse train to accommodate the first exposure period of the second image sensor, wherein modifying the one or more characteristics of the first illumination pulse train comprises inserting at least one additional illumination pulse in the first illumination pulse train such that one of a start time period or an end time period of an illumination period of the at least one additional illumination pulse is aligned with a respective one of a start time period or an end time period of the first exposure period of the second image sensor.

11. The imaging method of claim 10, further comprising:
causing exposure of the first image sensor during at least a second exposure period,
wherein the exposure of the first image sensor during the second exposure period begins simultaneously with a start time period of a first illumination pulse of the first illumination pulse train, and
wherein an end time period of the second exposure period extends beyond an end time period of the first illumination pulse of the first illumination pulse train.

12. The imaging method of claim 10, further comprising:
obtaining an image frame captured by exposure of the second image sensor during the first exposure period;
determining a brightness of the image frame; and
activating a second illumination source associated with the second image sensor, based on the determined brightness of the image frame, wherein the second illumination source is configured to operate based on a second illumination pulse train.

13. An apparatus, comprising:
a memory configured to store executable instructions; and
one or more processors configured to execute the executable instructions to:
control operation of a first illumination source associated with a first image sensor, based on a first illumination pulse train;
determine a first exposure period of a second image sensor; and
modify one or more characteristics of the first illumination pulse train to accommodate the first exposure period of the second image sensor by inserting at least one additional illumination pulse in the first illumination pulse train such that illumination of the first image sensor corresponding to the at least one additional illumination pulse temporally overlaps an autofocus period of the second image sensor.

14. The apparatus of claim 13, wherein the one or more processors are further configured to:
obtain an image frame captured by exposure of the second image sensor during the first exposure period;
determine a brightness of the image frame; and
activate a second illumination source associated with the second image sensor, based on the determined brightness of the image frame, wherein the second illumination source is configured to operate based on a second illumination pulse train.

* * * * *